(12) United States Patent
Noh et al.

(10) Patent No.: US 12,136,835 B2
(45) Date of Patent: Nov. 5, 2024

(54) ELECTRONIC DEVICE AND METHOD FOR CONFIRMING POWER RECEPTION DEVICE BY ELECTRONIC DEVICE

(71) Applicant: SAMSUNG ELECTRONICS CO., LTD., Suwon-si (KR)

(72) Inventors: Yunjeong Noh, Suwon-si (KR); Kihyun Kim, Suwon-si (KR); Dongzo Kim, Suwon-si (KR); Jihye Kim, Suwon-si (KR); Keyic Son, Suwon-si (KR); Taehyeon Yu, Suwon-si (KR); Kyungmin Lee, Suwon-si (KR); Hyungkoo Chung, Suwon-si (KR); Mincheol Ha, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 50 days.

(21) Appl. No.: 18/178,545

(22) Filed: Mar. 6, 2023

(65) Prior Publication Data
US 2023/0208208 A1    Jun. 29, 2023

Related U.S. Application Data

(63) Continuation of application No. PCT/KR2021/009345, filed on Jul. 20, 2021.

(30) Foreign Application Priority Data

Sep. 15, 2020    (KR) .................. 10-2020-0118668

(51) Int. Cl.
*H02J 50/80* (2016.01)
*H01F 38/14* (2006.01)
(Continued)

(52) U.S. Cl.
CPC .............. *H02J 50/80* (2016.02); *H01F 38/14* (2013.01); *H02J 50/12* (2016.02); *H02J 50/402* (2020.01); *H02J 50/90* (2016.02)

(58) Field of Classification Search
CPC ....... H01F 38/14; H02J 7/00034; H02J 50/10; H02J 50/12; H02J 50/40; H02J 50/402; H02J 50/80; H02J 50/90; H04B 5/79
See application file for complete search history.

(56) References Cited

U.S. PATENT DOCUMENTS

2014/0009109 A1* 1/2014 Lee .................. H02J 7/04
                                                    320/108
2014/0347006 A1   11/2014 Kim et al.
(Continued)

FOREIGN PATENT DOCUMENTS

EP          3700059 A1    8/2020
KR    10-2013-0102218 A    9/2013
(Continued)

OTHER PUBLICATIONS

International Search Report mailed Nov. 2, 2021 for PCT/KR2021/009345.
(Continued)

*Primary Examiner* — Levi Gannon
(74) *Attorney, Agent, or Firm* — CANTOR COLBURN LLP

(57) ABSTRACT

An electronic device includes: coils; power conversion circuits configured to receive direct current (DC) power, convert the DC power into alternating current (AC) power, and output the AC power to the coils; and a processor. The processor is configured to: apply to the coils a ping signal of which a ping power section is repeated periodically and which has a plurality of ping power levels increasing in phases; confirm an SSP signal responding to the ping signal; and perform wireless power transmission by the coils on the basis of a ping power level in which the SSP signal is confirmed from among the plurality of ping power levels.

20 Claims, 13 Drawing Sheets

(51) Int. Cl.
  *H02J 50/12* (2016.01)
  *H02J 50/40* (2016.01)
  *H02J 50/90* (2016.01)

(56) References Cited

U.S. PATENT DOCUMENTS

| | | | |
|---|---|---|---|
| 2014/0347007 A1 | 11/2014 | Kee et al. | |
| 2015/0270718 A1* | 9/2015 | Hwang | H04B 5/79 |
| | | | 307/104 |
| 2016/0254705 A1 | 9/2016 | Jung et al. | |
| 2016/0373166 A1 | 12/2016 | Yang et al. | |
| 2018/0131242 A1* | 5/2018 | Louis | H04B 5/72 |
| 2018/0138749 A1 | 5/2018 | Lee et al. | |
| 2018/0301933 A1 | 10/2018 | Lee et al. | |
| 2018/0301936 A1 | 10/2018 | Lee et al. | |
| 2018/0358841 A1* | 12/2018 | Park | H02J 7/02 |
| 2019/0148987 A1 | 5/2019 | Jung | |
| 2019/0267849 A1* | 8/2019 | Ha | H02J 50/12 |
| 2019/0296799 A1 | 9/2019 | Park | |
| 2019/0348853 A1* | 11/2019 | Swan | H02J 50/10 |
| 2019/0356175 A1 | 11/2019 | Jo et al. | |
| 2019/0371515 A1* | 12/2019 | Ha | H02J 50/70 |
| 2020/0235610 A1 | 7/2020 | Jung | |
| 2020/0295606 A1 | 9/2020 | Park et al. | |

FOREIGN PATENT DOCUMENTS

| | | |
|---|---|---|
| KR | 10-2014-0007273 A | 1/2014 |
| KR | 10-2017-0054708 A | 5/2017 |
| KR | 10-2019-0015860 A | 2/2019 |
| KR | 10-2019-0061359 A | 6/2019 |
| KR | 10-2019-0138631 A | 12/2019 |
| KR | 10-2020-0083403 A | 7/2020 |
| KR | 10-2020-0101109 A | 8/2020 |

OTHER PUBLICATIONS

The extended European search report for EP Application No. 21869523.7 mailed on Jul. 10, 2024, citing the above reference(s).

* cited by examiner

ELECTRONIC DEVICE AND METHOD FOR CONFIRMING POWER RECEPTION DEVICE BY ELECTRONIC DEVICE

CROSS-REFERENCE TO RELATED APPLICATION(S)

This application is a continuation application, claiming priority under § 365(c), of International Application No. PCT/KR2021/009345, filed on Jul. 20, 2021, which is based on and claims the benefit of Korean patent application number 10-2020-0118668, filed on Sep. 15, 2020, in the Korean Intellectual Property Office, the disclosures of which are incorporated by reference herein in their entireties.

BACKGROUND

1. Technical Field

Various embodiments relate to an electronic device and a method for identifying a power reception device by an electronic device.

2. Description of the Related Art

There has been increasing use of electronic devices that are easily carried, such as smartphones, tablet PC, or wearable devices, and a single user may utilize multiple portable electronic devices. Portable electronic devices may include rechargeable secondary batteries such that users can use the electronic devices for a designated time without separately receiving external power supply. Secondary batteries may be charged in a wired or wireless charging type. According to the wireless charging type, electric energy may be converted into electromagnetic waves having frequencies appropriate for respective electronic devices and wirelessly transferred thereto without transmission wires. For example, a single wireless power transmission device (for example, charging pad) may be used to charge one or more electronic devices.

According to wireless power transfer (or charging) technology, electric power is transferred by using an electromagnetic field induced in a coil. An electric current is applied to a transmission coil, thereby generating an electromagnetic field, and an induced current is formed in a reception coil by the generated electromagnetic field, thereby supplying electric energy.

According to the wireless power transfer technology, electric energy may be converted into an electromagnetic wave having a frequency and wirelessly transferred as a load without a transmission wire. According to the wireless power transfer technology, power may be wirelessly transferred from a power transmission device to a power reception device without wired connection between the power transmission device and the power reception device, thereby charging the battery of the power reception device. The wireless power transfer technology may include a magnetic induction type and a magnetic resonance type, and various other types of wireless power transfer technology may exist.

SUMMARY

An electronic device callable or wirelessly transmitting power (for example, wireless power transmission device) may output a ping signal and receive a response signal (for example, signal strength packet (SSP)) to the ping signal, thereby identifying a wireless power reception device. The wireless power transmission device may output a ping signal having a designated voltage (or current or power) or frequency in each designated time period (or ping interval). The wireless power reception device may not recognize the wireless power transmission device if the power of a received ping signal is low. If the power of the received ping signal is too large, the wireless power reception device may cause an error due to the ping signal having a large voltage.

Meanwhile, an electronic device callable or wirelessly transmitting power (for example, wireless power transmission device) may include a plurality of coils in order to provide a wider charging area, may output a plurality of ping signals through the plurality of coils, respectively, and may identify the position of a wireless power reception device, based on an SSP signal received through at least one of the plurality of coils. When a plurality of SSP signals are received through a plurality of coils, it may be difficult to identify the position of the wireless power reception device.

An electronic device and a method for operating the electronic device, according to various embodiments, may provide a ping signal having a plurality of ping power levels, the ping power of which increases stepwise (or in stages), such that a wireless power reception device can receive wireless power, based on a ping signal appropriate for itself, among the plurality of ping power levels.

An electronic device and a method for operating the electronic device, according to various embodiments, may provide a ping signal having a plurality of ping power levels, the ping power of which increases stepwise, through a plurality of coils and may identify a wireless power reception device, based on a ping power level that has been responded to, among the plurality of ping power levels, thereby effectively identifying the position of a wireless power device and efficiently selecting a coil for wireless power transmission.

An electronic device according to various embodiments includes a coil, a power conversion circuit configured to receive direct current (DC) power, convert the received DC power into alternating current (AC) power, and output the AC power to the coil, and a processor, where the processor is configured to apply, to the coil, a ping signal in which a ping power duration having a plurality of ping power levels increasing in stages is repeated periodically, identify a signal strength packet (SSP) signal in response to the ping signal, and perform a wireless power transfer operation through the coil based on a ping power level at which the SSP signal is identified from among the plurality of ping power levels.

An electronic device according to various embodiments includes a plurality of coils, a plurality of power conversion circuits each configured to receive DC power, convert the DC power into AC power, and output the AC power to each of the plurality of coils, and a processor, where the processor is configured to apply, to each of the plurality of coils, a ping signal in which a ping power duration having a plurality of ping power levels increasing in stages is repeated periodically, identify at least one coil, through which a signal strength packet (SSP) signal in response to the ping signal is detected, among the plurality of coils, and select a coil for wireless power transfer based on a ping power identified during detection of the SSP signal among the at least one coil.

A method for identifying a wireless power reception device by an electronic device according to various embodiments includes applying, to each of a plurality of coils of the electronic device, a ping signal in which a ping power duration having a plurality of ping power levels increasing in stages is repeated periodically, identifying at least one coil, through which a signal strength packet (SSP) signal in response to the ping signal is detected, among the plurality of coils, selecting a coil for wireless power transfer based on a ping power identified during detection of the SSP signal among the at least one coil, and wirelessly transmitting power through the selected coil.

According to various embodiments, an electronic device may provide a ping signal having a plurality of ping power levels, the ping power of which increases stepwise, thereby providing a ping signal having power appropriate for a wireless power reception device.

According to various embodiments, an electronic device may provide a ping signal having a plurality of ping power levels, the ping power of which increases stepwise, thereby supplying electric power at a power level appropriate for a wireless power reception device.

According to various embodiments, an electronic device may provide a ping signal having a plurality of ping power levels, the ping power of which increases stepwise, through a plurality of coils and, when a plurality of SSP signals are received through the plurality of coils, may identify a coil that receives an SSP signal with regard to a ping signal having a low ping power level, thereby effectively identify the position of a wireless power device and efficiently selecting a coil for wireless power transmission.

Advantageous effects obtainable from the disclosure are not limited to the above-mentioned advantageous effects, and other advantageous effects not mentioned herein will be clearly understood from the following description by those skilled in the art to which the disclosure pertains.

BRIEF DESCRIPTION OF DRAWINGS

In connection with the description of the drawings, the same or similar reference signs may be used for the same or similar elements.

DETAILED DESCRIPTION

Figure 1:
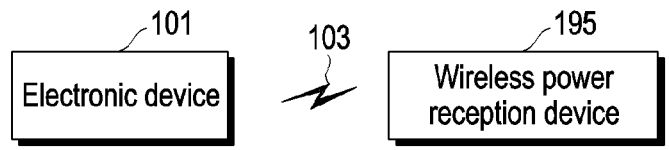
FIG. 1 illustrates an electronic device and a wireless power reception device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Terms used in this document are only used to describe specific embodiments, and may not be intended to limit the scope of other embodiments. Unless the context indicates otherwise, the singular expression may include the plural expression. All terms used herein, including technical or scientific terms, may have the same meaning as that commonly apprehended by those skilled in the art. The terms defined in the commonly-used dictionary may be interpreted as having the same or similar meaning as the meaning in the context of the related art, and unless explicitly defined in this document, are not interpreted in an ideal or excessively formal meaning. In some cases, even terms defined in this document cannot be construed to exclude embodiments of the disclosure.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 illustrates an electronic device and a wireless power reception device according to an embodiment.

Referring to FIG. 1, an electronic device 101 according to an embodiment may wirelessly transmit power 103 to a wireless power reception device 195. The electronic device 101 may transmit the power 103 to the wireless power reception device 195 according to various charging methods. For example, the electronic device 101 may transmit the power 103 according to an induction method. In an embodiment using the induction method, the electronic device 101 may include, for example, a power source, a direct current-to-alternating current (DC-AC) conversion circuit, an amplification circuit, an impedance matching circuit, at least one capacitor, at least one coil, and/or a communication modulation/demodulation circuit. The at least one capacitor may constitute a resonance circuit together with the at least one coil. The electronic device 101 may be implemented in a manner defined in a wireless power consortium (WPC) standard (or Qi standard) or a power matters alliance (PMA) standard. For example, the electronic device 101 may transmit the power 103 according to a resonance method. In an embodiment using the resonance method, the electronic device 101 may include, for example, a power source, a DC-AC conversion circuit, an amplification circuit, an impedance matching circuit, at least one capacitor, at least one coil, and/or an out-band communication circuit. (e.g., a short-range communication circuit such as Bluetooth, Bluetooth low energy (BLE), or Wi-Fi). At least one capacitor and at least one coil may constitute a resonance circuit. The electronic device 101 may be implemented in a manner defined in an alliance for wireless power (A4WP) standard (or an air fuel alliance (AFA) standard). The electronic device 101 may include a coil capable of generating (or configured to generate) an induced magnetic field when a current flows therein according to the resonance method or induction method. A process in which the electronic device 101 generates an induced magnetic field may be expressed or understood as the electronic device 101 performing wireless transmission of the power 103. In addition, the wireless power reception device 195 may include a coil having an induced electromotive force generated by a magnetic field formed therearound and the magnitude of which changes according to time. A process of generating the induced electromotive force through the coil may be expressed or understood as the wireless power reception device 195 wirelessly receiving the power 103.

The electronic device 101 according to various embodiments of the disclosure may be configured to perform communication with the wireless power reception device 195. In an embodiment, for example, the electronic device 101 may be configured to perform communication with the wireless power reception device 195 according to an in-band method. In such an embodiment where the electronic device 101 performs communication using the in-band method, the electronic device 101 or the wireless power reception device 195 may be configured to change the load (or impedance) of data, which is to be transmitted through substantially the same frequency band as the frequency for power transmission or reception, according to, for example, an amplitude-shift keying (ASK) or on/off keying modulation method. The electronic device 101 may determine data transmitted from a counterpart device by measuring a load change (or impedance change) based on a change in the magnitude of current, voltage, or power of a coil. In an alternative embodiment, for example, the electronic device 101 may be configured to perform communication with the wireless power reception device 195 according to an out-band method. In such an embodiment where the electronic device 101 performs communication using the out-band method, the electronic device 101 or the wireless power reception device 195 may be configured to transmit or receive data through a frequency band different from a frequency at which power transmission or reception is performed using a communication circuit (e.g., BLE communication module) provided separately from a coil or patch antenna.

The electronic device 101 according to various embodiments may include at least one coil, at least one power conversion circuit configured to receive DC power, convert the DC power into AC power, and output the AC power to the coil, and at least one transmission integrated circuit (IC), where the transmission IC may be configured to apply, to the coil, a ping signal in which a ping power duration (e.g., a section or a period) having a plurality of ping power levels increasing in stages is repeated periodically, allow the wireless power reception device 195 to identify a signal strength packet (SSP) signal in response to the ping signal, determine a coil on which the wireless power reception device 195 is located among the at least one coil based on a ping power level at which the SSP signal is identified among the plurality of ping power levels, and transmit power to the wireless power reception device 195 through a coil selected based on a result of the determination.

The plurality of ping power levels according to various embodiments may include a first power level and a second power level higher than the first power level.

The power conversion circuit according to various embodiments may be configured to increase a power level of the ping signal from the first power level to the second power level based on a voltage.

The power conversion circuit according to various embodiments may be configured to increase the power level of the ping signal from the first power level to the second power level based on a frequency.

In various embodiments of the disclosure, performing a specific operation by the electronic device 101 or the wireless power reception device 195 may be understood as performing a specific operation by various hardware included in the electronic device 101 or the wireless power receiving device 195, for example, a control circuit, such as a processor (e.g., a transmission IC and/or a micro controlling unit (MCU)), and/or a power conversion circuit. Alternatively, performing a specific operation by the electronic device 101 or the wireless power reception device 195 may be understood as controlling, by the processor, another hardware to perform a specific operation. Alternatively, performing a specific operation by the electronic device 101 or the wireless power reception device 195 may be understood as causing the processor or other hardware to perform a specific operation according to execution of an instruction for performing a specific operation having been stored in a storage circuit (e.g., memory) of the electronic device 101 or the wireless power reception device 195.

Figure 2:
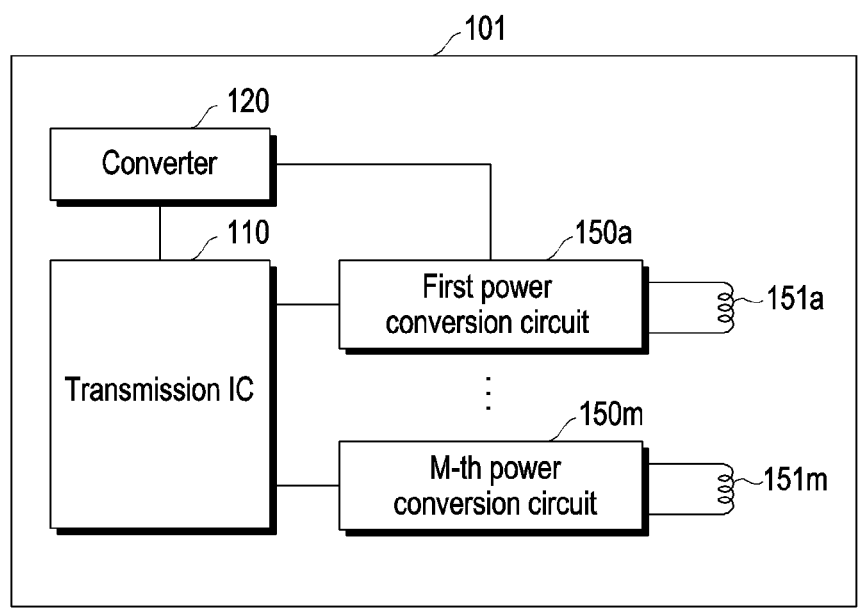
FIG. 2 is a block diagram of an electronic device capable of wirelessly transmitting power according to an embodiment.

FIG. 2 is a block diagram of an electronic device capable of wirelessly transmitting power according to an embodiment.

The electronic device 101 according to an embodiment may include a transmission IC 110, a converter 120, a plurality of power conversion circuits 150a, ..., and 150m, and a plurality of coils 151a, ..., and 151m corresponding to the power conversion circuits 150a, ..., and 150m, respectively.

The transmission IC 110 according to an embodiment may be configured to perform at least one operation for detecting a wireless power reception device (e.g., the wireless power reception device 195). The transmission IC 110 may be configured to perform at least one operation for identifying or receiving information from the wireless power reception device. The transmission IC 110 may be configured to perform at least one operation for providing power to the wireless power reception device. The transmission IC 110 may be a processor (controller) capable of performing at least some of the above-described operations, and thus may be referred to as a processor or a controller. The transmission IC 110 may be implemented as a dedicated controller for wireless charging only, but in some cases, may be implemented as one with a main processor (e.g., MCU) configured to manage the overall operation of the electronic device 101.

The transmission IC 110 according to an embodiment may be configured to perform at least one operation for detection. For example, the transmission IC 110 may be configured to control at least one selected from the plurality of power conversion circuits 150a, ..., and 150m, to apply a ping signal to a corresponding one of the plurality of coils 151a, ..., and 151m. The ping signal according to an embodiment may include a ping signal in which a ping power duration having a ping power level increasing in stages is periodically repeated (e.g., also referred to as a 'step ping signal'). For example, the transmission IC 110 may be configured to apply a pulse corresponding to a step ping signal to the at least one selected from the plurality of power conversion circuits 150a, ..., and 150m, or control another hardware to apply a pulse corresponding to a step ping signal. Although only the plurality of coils 151a, ..., and 151m are illustrated in FIG. 2, it will be understood by those skilled in the art that at least one capacitor may be further connected to each of the plurality of coils 151a, ..., and 151m.

Each of the plurality of power conversion circuits 150a, ..., and 150m according to an embodiment may include a coil selection switch, or the coil selection switch may be disposed between the transmission IC 110 and each of the plurality of power conversion circuits 150a, ..., and 150m. The transmission IC 110 may be configured to control the on/off state of the coil selection switch so that a step ping signal is applied to a specific coil. The plurality of power conversion circuits 150a, ..., and 150m may be configured to output AC power by using DC power (e.g., a bridge voltage or a driving voltage) input from the converter 120, and may be an inverter, for example. The converter 120 may be configured to convert the voltage of DC power from a power source (not shown) and provide the converted voltage to the plurality of power conversion circuits 150a, ..., and 150m.

The converter 120 according to an embodiment may be configured to provide operating power of the transmission IC 110. The converter 120 may be implemented as any one of a buck converter, a boost converter, or a buck/boost converter, but is not limited thereto. The power conversion circuits 150a, ..., and 150m may be configured to provide AC power corresponding to a step ping signal to each of the plurality of coils 151a, ..., and 151m. The transmission IC 110 may be configured to sequentially control each of the plurality of power conversion circuits 150a, ..., and 150m so that step ping signals are sequentially applied to each of the plurality of coils 151a, ..., and 151m.

The converter 120 according to an embodiment may be configured to control one (e.g., the first power conversion circuit 150a) of the power conversion circuits 150a, ..., and 150m so that a step ping signal is applied to one (e.g., the first coil 151a) of the plurality of coils 151a, ..., and 151m. According to an embodiment, the step ping signal may be a signal in which a ping power duration having a plurality of ping power levels increasing in stages is repeated every designated time period. According to an embodiment, the converter 120 may be configured to control such that plurality of ping power levels are increased in stages within a ping power duration using current, voltage, and/or frequency. In an embodiment, for example, the ping power duration may include a first ping power duration having a first power level based on a first voltage (e.g., about 5 volts(V)) and a second ping power duration based on a second voltage (e.g., about 6.5 V) having a second power level higher than the first power level. In an alternative embodiment, for example, the ping power duration may include a first ping power duration having a first power level based on a first frequency (e.g., 140 kilohertz (kHZ) to 145 kHz) and a second ping power duration having a second power level higher than the first power level based on a second frequency (e.g., 140 kHz to 145 kHz). The ping power duration may further include one or more other ping power durations having a power level higher than the second power level in addition to the first ping power duration and the second ping power duration.

The wireless power reception device may be configured to receive a step ping signal based on ping power levels increasing in stages, and in the case of receiving the ping signal, transmit a response (e.g., a signal strength packet (SSP)) with respect to the ping signal. In an embodiment, the wireless power reception device may perform load modulation based on the step ping signal. In an embodiment, for example, the wireless power reception device may be configured to perform load modulation through a load modulation module included therein (e.g., by turning on/off a switch included for communication and a load modulation circuit), based on the step ping signal. In an embodiment, for example, the wireless power reception device may respond at a ping power level of a suitable level (or a specific level) of a step ping signal based on the ping power levels increasing in stages from the electronic device 101. In an embodiment, for example, the wireless power reception device may be configured not to respond at a first ping power level but to respond at a second ping power level of a step ping signal having a first ping power level (e.g., 5 V) and a second ping power level (e.g., 6.5 V) from the electronic device 101.

A load change of the wireless power reception device may be detected by the electronic device 101. In an embodiment, for example, the electronic device 101 may sense a voltage and/or current applied to the first coil 151a while outputting (or after outputting) a step ping signal. The electronic device 101 may further include a sensor capable of sensing a voltage and/or current applied to the plurality of coils 151a, . . . , and 151m while outputting the step ping signal. The transmission IC 110 may be configured to demodulate a signal detected from the coil, for example, the sensed voltage and/or current while outputting the step ping signal. The transmission IC 110 may be configured to, based on a result of the demodulation, identify a ping power level at which information (e.g., SSP) transmitted by the wireless power reception device is identified among a plurality of ping power levels of the ping power duration of the step ping signal. The transmission IC 110 may further identify a received power strength value (e.g., an SSP value) in the power reception device based on the identified SSP. An operation of the wireless power reception device performing load modulation may be referred to as transmitting a communication signal. An operation of the electronic device 101 performing demodulation and identifying information based on the demodulation result may be referred to as receiving a communication signal. The transmission IC 110 may be configured to select, based on the ping power levels and/or SSP values identified for the plurality of coils 151a, . . . , and 151m, a coil to be used for wireless power transfer or a coil on which a wireless power reception device is disposed among the plurality of coils 151a, . . . , and 151m.

In an embodiment, for example, the transmission IC 110 may be configured to select a coil having the identified lowest ping power level among the ping power levels identified for the plurality of coils 151a, . . . , and 151m. In an alternative embodiment, for example, the transmission IC 110 may be configured to select a coil having the largest SSP value in case that there are two or more coils having the identified lowest ping power level among the ping power levels identified for the plurality of coils 151a, . . . , and 151m.

An electronic device (e.g., the electronic device 101) according to various embodiments may include a plurality of coils (e.g., 151a, . . . , and 151m), a plurality of power conversion circuits (e.g., 151a, . . . , and 151m) each configured to receive DC power, convert the DC power into AC power, and output the AC power to each of the plurality of coils, and at least one processor (e.g., a transmission IC (e.g., reference numeral 110)), where the at least one processor is configured to apply, to the coil, a ping signal in which a ping power duration having a plurality of ping power levels increasing in stages is periodically repeated, identify at least one coil through which a signal strength packet (SSP) signal in response to the ping signal is detected among the plurality of coils, and select a coil for wireless power transfer among the plurality of coils based on the ping power identified when the SSP signal is detected through each of the at least one coil.

The at least one processor according to various embodiments may be configured to, in case where the SSP signal is detected through two or more coils, select a coil through which the SSP signal is detected at the lowest ping power level among the plurality of coils.

The at least one processor according to various embodiments may be configured to, in case where the SSP signal is detected at the lowest ping power level through two or more coils, identify SSP values detected in the coils through which the SSP signal is detected at the lowest ping power level, and select a coil, based on the SSP values.

The at least one processor according to various embodiments may be configured to select a coil having the largest SSP value among the SSP values.

The at least one processor according to various embodiments may be configured to sequentially apply a ping signal to each of the plurality of coils.

The at least one processor according to various embodiments may be configured to apply a ping signal to coils in a sequence of coils non-adjacent to each other, based on the arrangement of the plurality of coils.

The plurality of ping power levels according to various embodiments may include a first ping power level and a second power level higher than the first power level.

Each of the plurality of power conversion circuits according to various embodiments may be configured to increase the power level of the ping signal from the first power level to the second power level based on a voltage and/or a frequency.

Figure 3:
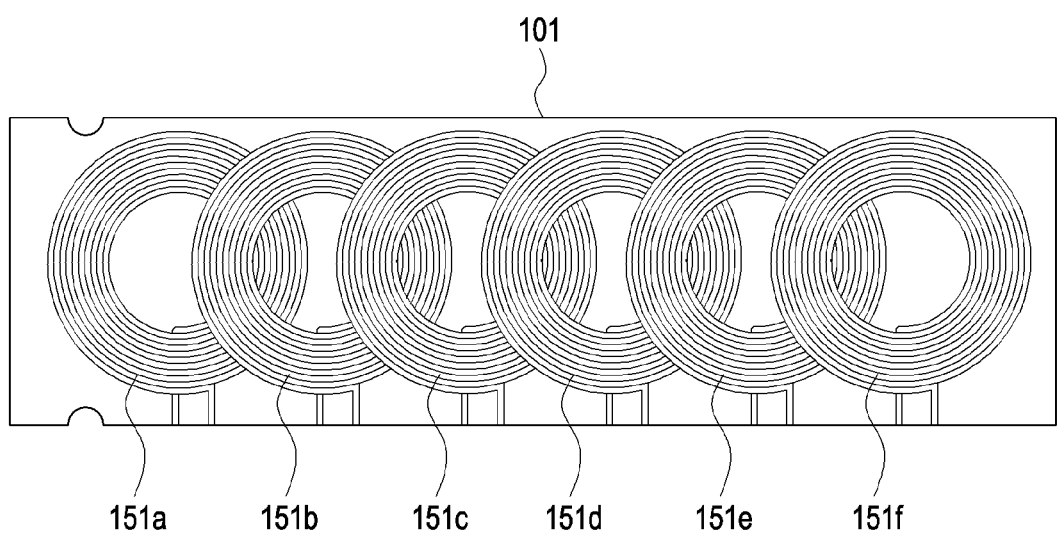
FIG. 3 illustrates a coil arrangement in an electronic device according to an embodiment.

FIG. 3 illustrates a coil arrangement in an electronic device according to an embodiment.

According to an embodiment, the electronic device 101 may include a plurality of coils 151a, 151b, 151c, 151d, 151e, and 151f. Although the plurality of coils 151a, 151b, 151c, 151d, 151e, and 151f are illustrated as being aligned in one direction (e.g., the x-axis direction) in the embodiment of FIG. 3, there is no limitation in the alignment direction or arrangement shape of the plurality of coils 151a, 151b, 151c, 151d, 151e, and 151f. In an alternative embodiment, for example, the plurality of coils 151a, 151b, 151c, 151d, 151e, and 151f may be arranged in a plurality of columns in any one direction (e.g., the x-axis direction). In FIG. 3, the plurality of coils 151a, 151b, 151c, 151d, 151e, and 151f are arranged in a manner of overlapping each other between adjacent coils, but this is also exemplary and there is no limitation on whether the adjacent coils overlap each other. In an embodiment, for example, intervals between the plurality of coils 151a, 151b, 151c, 151d, 151e, and 151f may be partially different from each other. In an embodiment, as shown in FIG. 3, as the plurality of coils 151a, 151b, 151c, 151d, 151e, and 151f are arranged, a charging area provided by the electronic device 101 may be wider than that in a case where a single coil is provided, and the charging freedom of the wireless power reception device (e.g., the wireless power reception device 195) may be increased. In an embodiment, as shown in FIG. 3, the plurality of coils 151a, 151b, 151c, 151d, 151e, and 151f may have a same shape as each other, but at least a part of the plurality of coils 151a, 151b, 151c, 151d, 151e, 151f may have a different shape. For example, a part of the number of turns of the coil, the shape of the coil, the size (e.g., inner diameter or outer diameter) of the coil, and/or the thickness of the coil may be variously modified to be different one from another.

Figure 4:
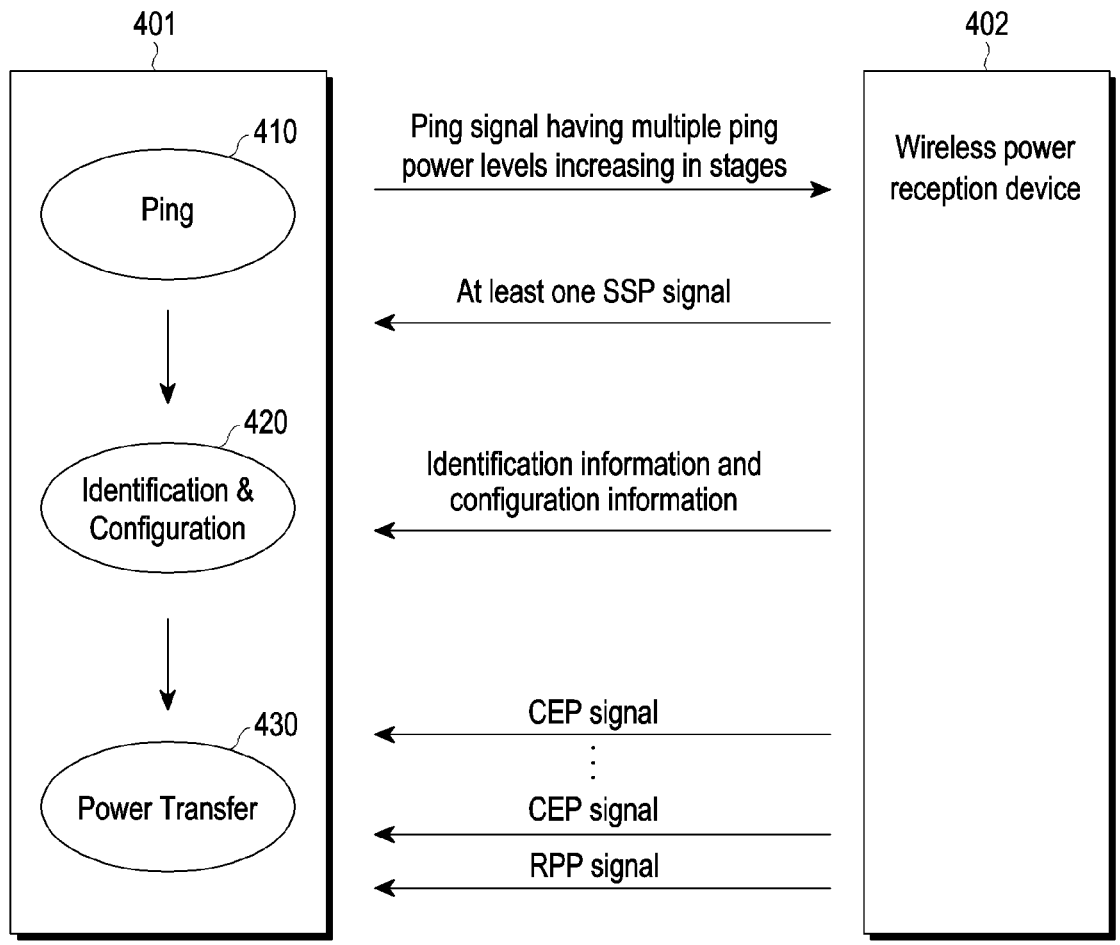
FIG. 4 illustrates an operation state for power transfer to a wireless power reception device in an electronic device according to an embodiment.

FIG. 4 illustrates an operation state for power transfer to a wireless power reception device in an electronic device according to an embodiment.

Referring to FIG. 4, according to an embodiment, an electronic device 401 (e.g., the electronic device 101 of FIG. 1) may be configured to transmit or receive one or more signals corresponding to a ping phase 410, an authentication phase (identification & configuration) 420, and/or a power transfer phase 430 in order to provide power to a wireless power reception device 402 (e.g., the wireless power reception device 195 of FIG. 1).

According to an embodiment, the electronic device 401 may be configured to transmit a step ping signal, for example, a digital step ping signal or an analog step ping signal, in which a ping power duration having a plurality of ping power levels increasing in stages is repeated every designated time period in the ping phase 410. In an embodiment, for example, the electronic device 401 may be configured to periodically transmit a step ping signal based on a power transfer request.

According to an embodiment, the electronic device 401 may be configured to identify (sense or detect) the wireless power reception device 402 based on detection of a response (e.g., SSP) corresponding to the step ping signal from the wireless power reception device 402. According to an embodiment, the electronic device 401 may be configured to, in the case of detecting the wireless power reception device 402 by a single coil, output a step ping signal by the single coil and in case that the SSP corresponding to the step ping signal of the single coil is detected, identify a ping power level to which a response for the detected SSP corresponds. According to an embodiment, the electronic device 401 may be configured to, in the case of detecting the wireless power reception device 402 by two or more coils, sequentially output a plurality of step ping signals by the respective two or more coils and, in case that the SSP is detected, identify a coil among the two or more coils and a ping power level of the coil, to which a response for the detected SSP corresponds. According to an alternative embodiment, the electronic device 401 may be configured to, in the case of detecting the wireless power reception device 402 by two or more coils, output a ping signal having a first power level (e.g., a voltage of about 5 V) to the two or more coils and detect a response (e.g., SSP) corresponding to the ping signal, and output a ping signal having a second power level (e.g., a voltage of about 6.5 V) to the two or more coils and detect a response (e.g., SSP) corresponding to the ping signal. In an embodiment, for example, the electronic device 401 may be configured to, in the case of transmitting a plurality of step ping signals, transmit a ping signal to the plurality of coils at the same ping power level and then perform transmission of the ping signal to the plurality of coils by changing the ping power level in stages.

According to an embodiment, the electronic device 401 may be configured to, in case that two or more SSPs are detected, select a coil associated with an SSP signal received at the lowest ping power level. Alternatively, the electronic device 401 may be configured to, in case that two or more SSPs are detected, select a coil for wireless power transfer by identifying a ping power level and an SSP value associated with each of the plurality of SSP signals. In an embodiment, for example, the transmission IC 110 may be configured to, in case that the two or more SSP signals are detected through the plurality of coils, identify a coil associated with an SSP signal identified at the lowest ping power level and, in case that there are two or more coils associated with the SSP signal identified at the lowest ping power level, select a coil corresponding to the lowest ping power level and having the largest SSP value by identifying the SSP value identified through each coil. The electronic device 401 may be configured to enter an authentication phase (identification & configuration) based on the ping power level and/or SSP value of the selected coil to perform authentication, and after authentication, enter a power transfer phase to perform power transfer.

According to an embodiment, the electronic device 401 may be configured to receive, from the wireless power reception device 402, identification information and configuration information for authenticating the power reception device in the authentication phase (identification & configuration) 420. The identification information may include information for identifying the wireless power reception device 402, and the configuration information may include various types of information used for the wireless power reception device 402 to receive power. The electronic device 401 may be configured to authenticate the wireless power reception device 402 based on the identification information and configuration information from the wireless power reception device 402.

According to an embodiment, the electronic device 401 may be configured to receive charging mode information (e.g., a normal charging mode or a low-power charging mode) from the wireless power reception device 402 and wirelessly transmit power providing information associated with the charging mode information to the power reception device 402. The power providing information associated with the charging mode may include a transmission voltage, a power value, a frequency, or a parameter value for power transfer. The wireless power reception device 402 may determine a charging mode based on power providing information associated with the charging mode information.

According to an embodiment, the electronic device 401 may be configured to transmit a power signal for wireless power transfer to the wireless power reception device 402 in the power transfer phase 430 based on completion of authentication (or authentication and charging mode configuration). According to an embodiment, the electronic device 401 may be configured to receive at least one control error packet (CEP) signal or a received power packet (RPP) signal from the wireless power reception device 402 in the power transfer phase 430. The CEP signal may include information indicating the magnitude of transmission power to be transmitted from the electronic device 401, and the RPP signal may include information indicating the magnitude of reception power received by the wireless power reception device 402. The electronic device 401 may be configured to adjust the transmit power based on the CEP signal and/or the RPP signal.

Figure 5A:
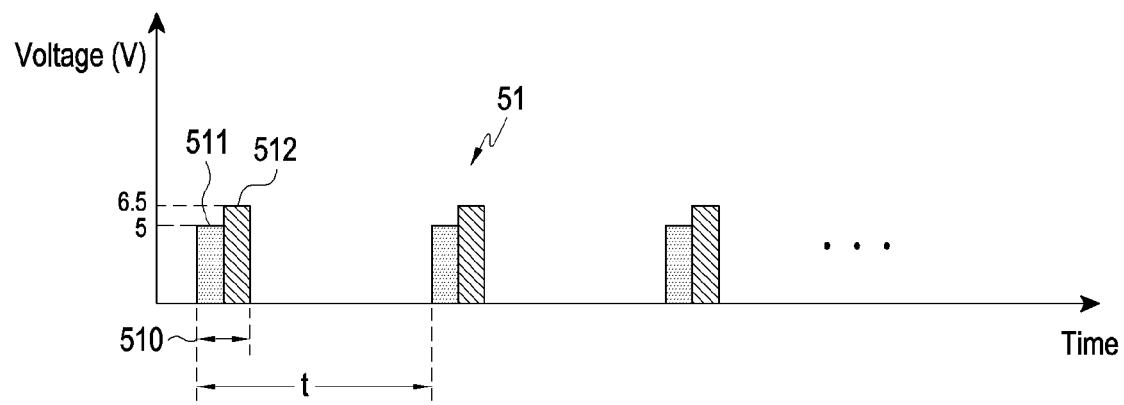
FIG. 5A illustrates an example of a first step ping signal according to an embodiment.
Figure 5B:
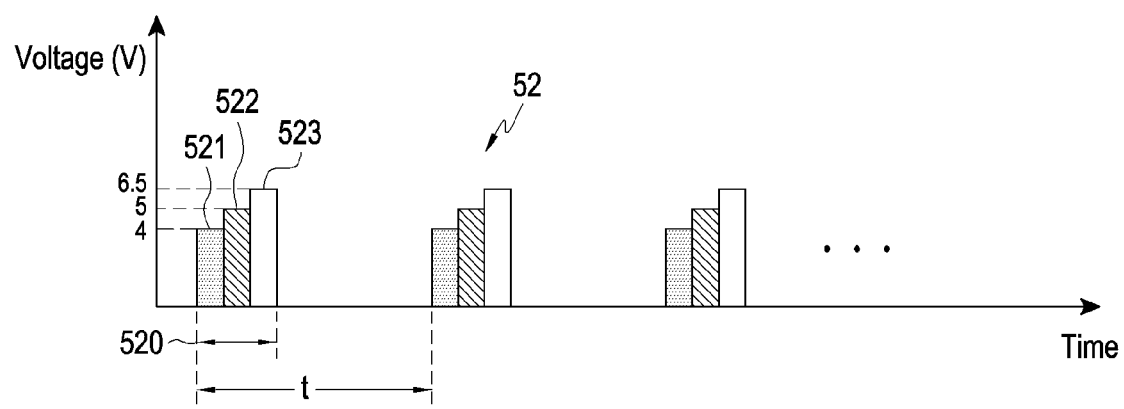
FIG. 5B illustrates an example of a second step ping signal according to an embodiment.

FIGS. 5A and 5B illustrate a step ping signal according to an embodiment. FIG. 5A illustrates an example of a first step ping signal 51 according to an embodiment, and FIG. 5B illustrates an example of a second step ping signal 52 according to an embodiment.

Referring to FIGS. 5A and 5B, the step ping signal 51 or 52 according to an embodiment may be a signal in which a ping power duration 510 or 520 having a plurality of ping power levels 511 and 512 or 521, 522, and 523 increasing in stages is repeated every designated time period (t). According to an embodiment, the plurality of ping power levels within the ping power duration may be increased in stages by using a current, a voltage, and/or a frequency. FIGS. 5A and 5B illustrate an example of increasing in the plurality of ping power levels based on a voltage.

Referring to FIG. 5A, the ping power duration 510 according to an embodiment may include a first ping power duration 511 having a first ping power level (e.g., about 5 V) and a second ping power duration 512 having a second power level (about 6.5 V) higher than the first power level.

Referring to FIG. 5B, the ping power duration 520 according to an embodiment may include a first ping power duration 521 having a first ping power level (e.g., about 4 V), a second ping power duration 522 having a second power level (e.g., 5V) higher than the first power level, and a third ping power duration 523 having a third power level (e.g., about 6.5 V) higher than the second power level.

According to various embodiments, the number of the plurality of power levels included in a ping power duration may be implemented to have the first to fourth ping power levels or to further have additional ping power levels having higher power levels without being limited to the example of FIGS. 5A and 5B. According to various embodiments, the plurality of power levels included in the ping power duration may be controlled based on voltage as in the example of FIGS. 5A and 5B, but may also be controlled based on current and/or frequency as well as voltage.

Figure 6A:
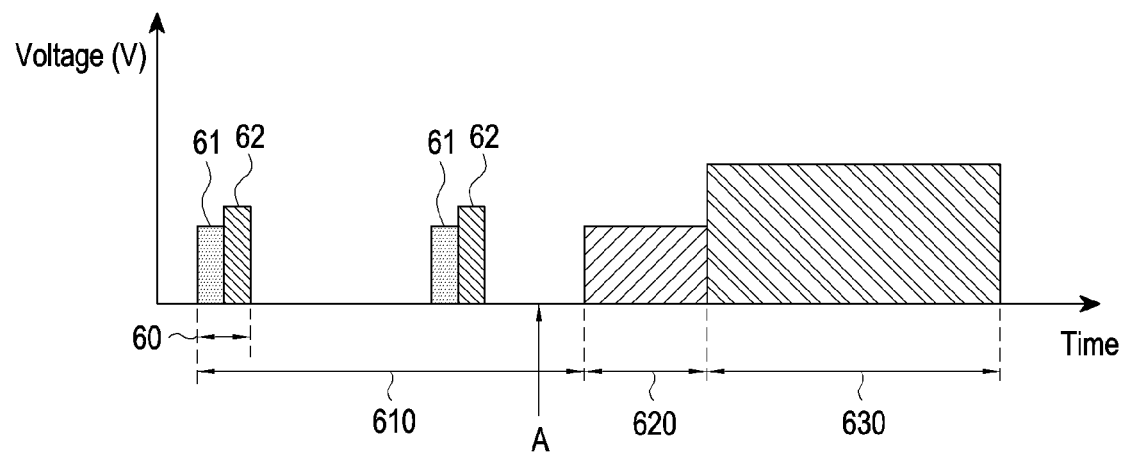
FIGS. 6A and 6B illustrate a state of wireless power transfer using a step ping signal in an electronic device according to an embodiment.
Figure 6B:
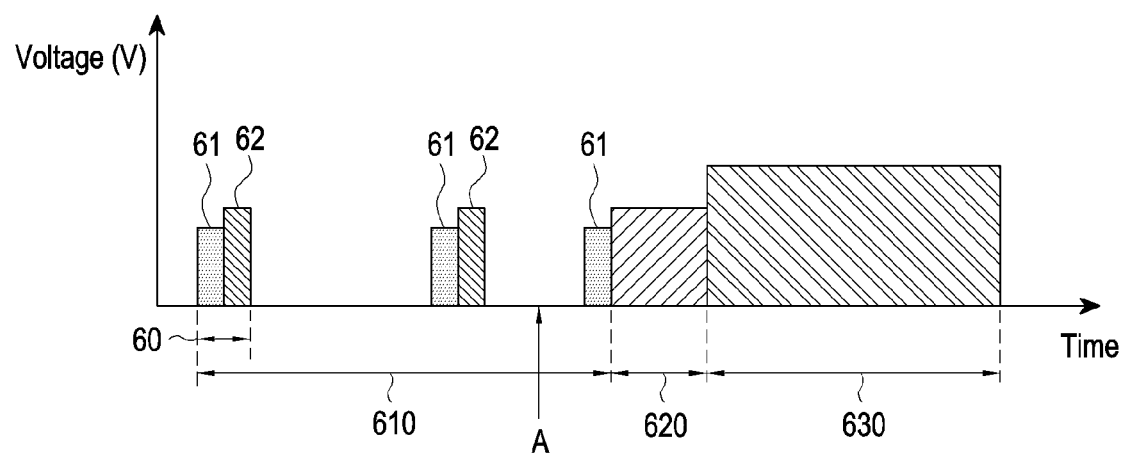

FIGS. 6A and 6B illustrate a state of wireless power transfer using a step ping signal in an electronic device according to an embodiment.

Referring to FIGS. 6A and 6B, the electronic device 101 according to an embodiment may enable, in a ping phase 610, a step ping signal having a plurality of ping power levels increasing in stages to be applied to one of a plurality of coils 151a, . . . , and 151m. According to an embodiment, the electronic device 101 may transmit a step ping signal for detecting an external device (e.g., the wireless power reception device 102) in a designated period. For example, a duration 60 for transmission of the step ping signal may include a first ping power level duration 61 and a second ping power level duration 62. According to an embodiment, when the wireless power reception device (e.g., reference numeral 102) is placed on the electronic device 101 during application of the step ping signal by the electronic device 101 (or when a condition, under which the step ping signal is detectable by the wireless power reception device, is satisfied) (A in FIGS. 6A and 6B), the step ping signal may be detected by the wireless power reception device. For example, when the wireless power reception device (e.g., reference numeral 102) is placed on the electronic device 101 (or when a condition, under which the step ping signal is detectable by the wireless power reception device, is satisfied) (A in FIGS. 6A and 6B), the first ping power level duration 61 of the step ping signal is loaded (or detected) by the wireless power reception device, or the second ping power level duration 62 higher than the first ping power level duration 61 is loaded (or detected) by the wireless power reception device.

For example, FIG. 6A shows a case in which the electronic device 101 transmits a step ping signal, the transmitted ping signal is loaded by the wireless power reception device in the first ping power level duration 61 to perform load modulation thereof, and an SSP signal in response to the first ping power is received by the electronic device 101 (or detected through a modulator of the electronic device) in the first ping power level duration 61. The electronic device 101 may be configured to enter an authentication phase (identification & configuration) 620 based on the first ping power level (e.g., about 5 V) at which the SSP signal is received from the wireless power receiver to perform authentication thereof, and enter the power transfer phase 630 to perform power transfer. According to an embodiment, when the SSP signal is received in response to the first ping power in the first ping power level duration 61, the electronic device 101 may be configured not to apply the step ping signal. In this case, the electronic device 101 may be configured to enter the authentication phase (identification & configuration) 620 based on the first ping power level (e.g., about 5 V) to perform authentication, and enter the power transfer phase 630 to perform power transfer.

In an alternative embodiment, for example, FIG. 6B shows a case in which the electronic device 101 transmits a step ping signal, the transmitted ping signal is loaded by the wireless power reception device in the second ping power level duration 62 to perform load modulation thereof, and an SSP signal in response to the second ping power level (e.g., about 6.5 V) of the second ping power level duration 62 is received by the electronic device. The electronic device 101 may be configured to enter an authentication phase (identification & configuration) 620 based on the second ping power level (e.g., about 6.5 V) at which the SSP signal has been received from the wireless power receiver to perform authentication thereof, and enter the power transfer phase 630 to perform power transfer. According to an embodiment, the electronic device 101 may be configured not to receive the SSP signal in response to the first ping power in the first ping power level duration 61, and to receive the SSP signal in response to the second ping power in the second ping power level duration 62. In this case, the electronic device 101 may be configured to enter the authentication phase (identification & configuration) 620 based on the second ping power level (e.g., about 6.5 V) to perform authentication, and enter the power transfer phase 630 to perform power transfer.

According to an embodiment, a step ping signal may be applied to one of the plurality of coils 151a, . . . , and 151m as described with reference to FIGS. 6A and 6B, but embodiments are not limited thereto. In an alternative embodiment, the electronic device may apply a step ping signal to each of the plurality of coils 151a, . . . , and 151m, identify a ping power level at which the SSP signal is received with respect to each of the plurality of coils 151a, . . . , and 151m, and then select a coil through which the SSP signal is received at the lowest ping power level to perform the authentication phase (identification & configuration) 620 and the power transfer phase 630 by using the lowest ping power level of the selected coil. For example, in case that there are two or more coils having received the SSP signal at the lowest ping power level, the authentication phase (identification & configuration) 620 and the power transfer phase 630 may be performed using the coil having the largest SSP value. According to an embodiment, the electronic device 101 (or a coil in the electronic device 101) may be configured to identify that the distance between the electronic device 101 (or a coil in the electronic device 101) and the wireless power reception device when the SSP is identified at the first ping power level 61 is closer than the distance between the electronic device 101 (or the coil in the electronic device 101) and the wireless power reception device when the SSP is identified at the second ping power level 62.

Figure 7:
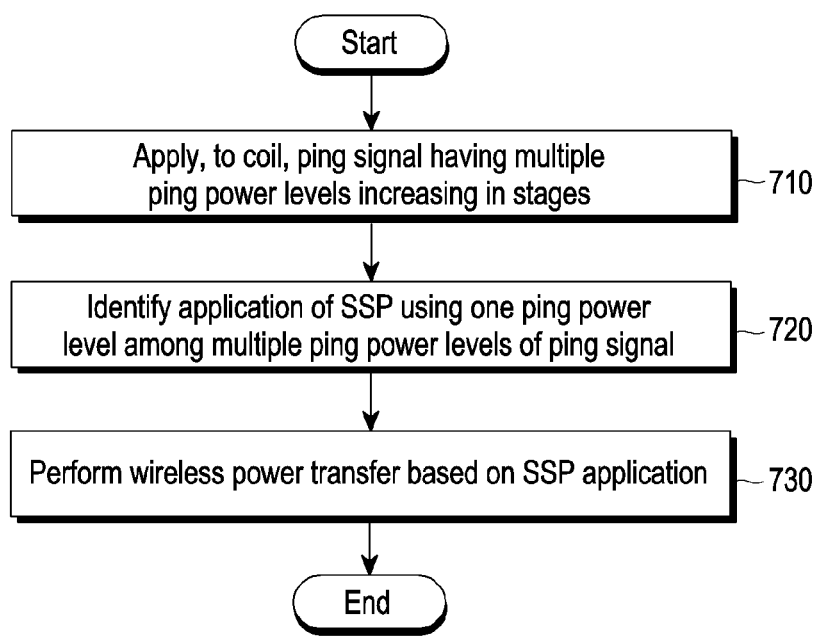
FIG. 7 is an operation flowchart illustrating a wireless power transfer method using a step ping signal in an electronic device according to an embodiment.

FIG. 7 is an operation flowchart illustrating a wireless power transfer method using a step ping signal in an electronic device according to an embodiment.

Referring to FIG. 7, the transmission IC 110 of the electronic device 101 according to an embodiment may be configured to perform at least one of operations 710 to 730.

In operation 710, the transmission IC 110 according to an embodiment may be configured to apply a ping signal having a plurality of ping power levels (or multiple ping power levels) increasing in stages to the coil. In an embodiment, for example, the transmission IC 110 may be configured to apply a pulse corresponding to a step ping signal to one of the power conversion circuits 150a, . . . , and 150m, or to control another hardware to apply the pulse corresponding to the step ping signal to enable the step ping signal to be applied to one of the plurality of coils 151a, . . . , and 151m. According to an embodiment, in case that the step ping signal is loaded by the wireless power reception device, the wireless power reception device may generate an SSP signal. For example, the wireless power reception device may generate an SSP signal corresponding to a power level at which the ping signal is received among a plurality of ping power levels of the step ping signal.

In operation 720, the transmission IC 110 according to an embodiment may be configured to identify whether an SSP corresponding to one of ping signals having a plurality of ping power levels is applied. According to an embodiment, the transmission IC 110 may be configured to identify whether the SSP signal generated by the wireless power reception device is applied to one of the plurality of coils 151a, . . . , and 151m, through the sensing of current, voltage, or frequency applied to the plurality of coils 151a, . . . , and 152m.

In operation 730, the transmission IC 110 according to an embodiment may be configured to perform wireless power transfer based on the identification of application of the SSP. For example, in case that an SSP signal is applied to the coil, in response to a ping signal of a specific ping power level, the transmission IC 110 may be configured to enter an authentication phase (identification & configuration) based on the specific ping power level to perform authentication, and then after authentication, enter a power transfer phase to perform power transfer.

A wireless power transfer method based on a ping signal having a plurality of ping power levels in an electronic device (e.g., the electronic device 101) according to various embodiments may include applying, to a coil, a ping signal in which a ping power duration having a plurality of ping power levels increasing in stages is repeated periodically, identifying an SSP signal in response to the ping signal, and transmitting wireless power through the coil based on a ping power level at which the SSP signal is identified among the plurality of ping power levels.

The plurality of ping power levels according to various embodiments may include a first ping power level and a second power level higher than the first power level.

According to various embodiments, the electronic device may be configured to provide a ping signal having a plurality of ping power levels at which a ping power is increased in stages, s to enable a wireless power reception device to start wireless power transfer at an appropriate ping power level.

Figure 8:
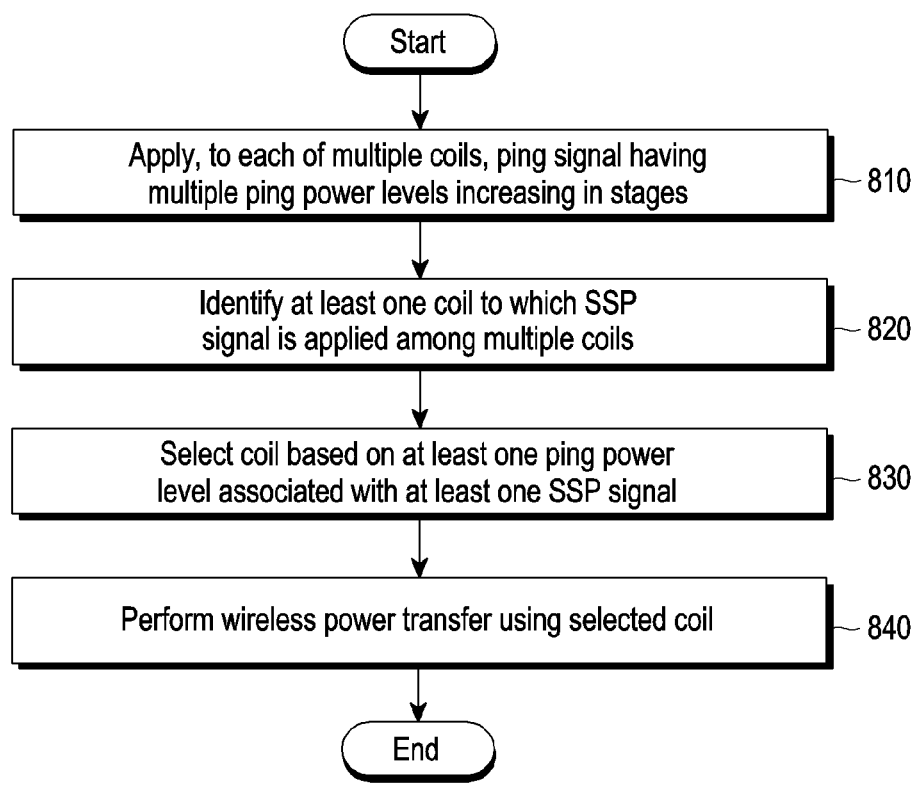
FIG. 8 is an operation flowchart illustrating a wireless power transfer method using a step ping signal in an electronic device using a plurality of coils according to an embodiment.

FIG. 8 is an operation flowchart illustrating a wireless power transfer method using a step ping signal in an electronic device using a plurality of coils according to an embodiment.

Referring to FIG. 8, the transmission IC 110 of the electronic device 101 according to an embodiment may be configured to perform at least one of operations 810 to 830.

In operation 810, the transmission IC 110 according to an embodiment may apply a ping signal having a plurality of ping power levels increasing in stages to each of the plurality of coils. For example, the transmission IC 110 may be configured to sequentially apply a pulse corresponding to a step ping signal to each of the power conversion circuits 150a, . . . , and 150m, or may be configured to control another hardware to apply the pulse corresponding to the step ping signal to enable the step ping signal to be sequentially applied to each of the plurality of coils 151a, . . . , and 151m.

In operation 820, the transmission IC 110 according to an embodiment may be configured to identify at least one coil to which an SSP signal is applied among the plurality of coils. For example, the transmission IC 110 may be configured to identify whether the SSP signal generated by the wireless power reception device is applied to one of the plurality of coils 151a, . . . , and 151m, through the sensing of current, voltage, or frequency applied to each of the plurality of coils 151a, . . . , and 152m.

In an embodiment, the transmission IC 110 according to an embodiment may be configured to identify at least one coil to which the SSP signal is applied among the plurality of coils. For example, the transmission IC 110 may be configured to identify the location of at least one coil to which the SSP signal is applied among the plurality of coils, and identify the mounting (or placement) position of the wireless power reception device based on the location of the at least one coil to which the SSP signal is applied. For example, in case that the at least one coil to which the SSP signal is applied corresponds to a first coil, the transmission IC 110 may be configured to identify that the wireless power reception device is mounted (or placed) at a location corresponding to the first coil, and in case that the at least one coil to which the SSP signal is applied corresponds to a first coil and a second coil, the transmission IC may be configured to identify that the wireless power reception device is mounted (or placed) at a location corresponding to the first coil and/or the second coil.

In operation 830, the transmission IC 110 according to an embodiment may be configured to select a coil for wireless power transfer based on at least one ping power level associated with at least one SSP signal. For example, the transmission IC 110 may be configured to identify a ping power level at which at least one SSP signal is identified, and select a coil associated with the SSP signal received at the lowest ping power level. According to an embodiment, the transmission IC 110 may be configured to select a coil for wireless power transfer by identifying an SSP value and at least one ping power level associated with at least one SSP signal. For example, the transmission IC 110 may be configured to identify a ping power level at which the at least one SSP signal is identified, identify a coil associated with the SSP signal identified at the lowest ping power level, and when there are two or more coils associated with the SSP signal identified at the lowest ping power level, identify each SSP value corresponding thereto and select a coil corresponding to the lowest ping power level and having a larger SSP value.

In operation 840, the transmission IC 110 according to an embodiment may be configured to perform wireless power transfer using the selected coil. For example, the transmission IC 110 may be configured to enter an authentication phase (identification & configuration) based on the ping power level and/or SSP value of the selected coil to perform authentication, and after authentication, enter a power transfer phase to perform power transfer. For example, the transmission IC 110 may configure a wireless power mode and transmit wireless power based on the ping power level of the selected coil. For example, the configuration of the wireless power mode may include configuration of a frequency, an applied voltage, and/or a transmission power strength in a power transfer mode of a wireless power signal to be transmitted from the electronic device 101.

A wireless power transfer method based on a ping signal having a plurality of ping power levels in an electronic device (e.g., the electronic device 101) according to various embodiments may include applying, to each of a plurality of coils (e.g., 151a, 151b, 151c, 151d, 151e, and 1510, a ping signal in which a ping power duration having a plurality of ping power levels increasing in stages is periodically repeated, identifying at least one coil through which a signal strength packet (SSP) signal in response to the ping signal is detected among the plurality of coils, selecting a coil for wireless power transfer based on ping power identified when an SSP signal is detected through each of the at least one coil, and wirelessly transmitting power through the selected coil.

In the method according to various embodiments, in case that there are two or more coils through which the SSP signal is detected, a coil through which the SSP signal is detected at the lowest ping power level may be selected among the two or more coils.

In the method according to various embodiments, in case that there are two or more coils through which the SSP signal is detected at the lowest ping power level, SSP values, which are detected in the coils through which the SSP signal is detected at the lowest ping power level, may be identified, and a coil may be selected based on the SSP values.

In the method according to various embodiments, a coil having the largest SSP value among the SSP values may be selected.

In the method according to various embodiments, a ping signal may be sequentially applied to each of the plurality of coils.

In the method according to various embodiments, the ping signal may be applied to coils in a sequence of coils non-adjacent to each other, based on the arrangement of the plurality of coils.

In the method according to various embodiments, the plurality of ping power levels may include a first ping power level and a second power level higher than the first power level.

According to various embodiments, the plurality of ping power levels may be increased from the first power level to the second power level based on a voltage and/or a frequency.

Figure 9:
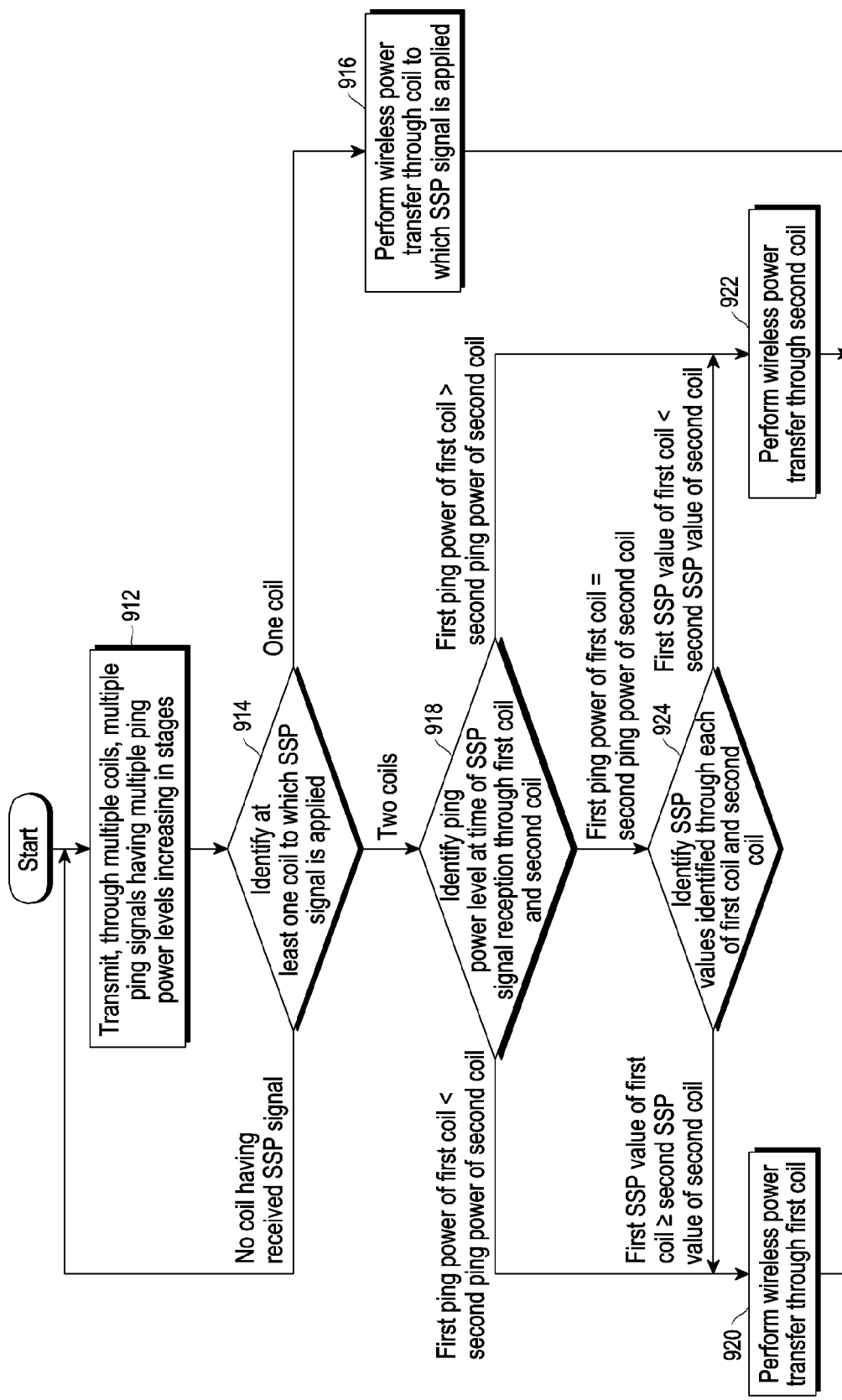
FIG. 9 is an operation flowchart illustrating a wireless power transfer method using a ping power level and an SSP value identified based on a step ping signal in an electronic device according to an embodiment.

FIG. 9 is an operation flowchart illustrating a wireless power transfer method using a ping power level and an SSP value, which are identified based on a step ping signal in an electronic device according to an embodiment.

Referring to FIG. 9, the transmission IC 110 of the electronic device 101 according to an embodiment may be configured to perform at least one of operations 912 to 924.

In operation 912, the transmission IC 110 according to an embodiment may be configured to transmits (or apply) a ping signal having a plurality of ping power levels increasing in stages to each of the plurality of coils. For example, the transmission IC 110 may be configured to sequentially apply a pulse corresponding to a step ping signal to each of the plurality of power conversion circuits 150a, . . . , and 150m, or control another hardware to apply the pulse corresponding to the step ping signal to enable the step ping signal to be sequentially applied to each of the plurality of coils 151a, . . . , and 151m.

In operation 914, the transmission IC 110 according to an embodiment may be configured to identify at least one coil to which the SSP signal is applied among the plurality of coils. For example, the transmission IC 110 may be configured to identify whether the SSP signal generated by the wireless power reception device is applied to each of the plurality of coils 151a, . . . , and 151m, through the sensing of current, voltage, or frequency applied to each of the plurality of coils 151a, . . . , and 151m. For example, the transmission IC 110 may be configured to identify whether there is no coil to which the SSP signal is applied among the plurality of coils, whether there is one coil (or a single coil) to which the SSP signal is applied among the plurality of coils, and whether there are two or more coils (hereinafter, a case where the SSP signal is applied to "two coils" will be described as an example) to which the SSP signal is applied. In operation 916, if there is no coil to which the SSP signal is applied among the plurality of coils, the transmission IC 110 may be configured to repeatedly perform operation 912. According to an embodiment, in case that there is no coil to which an SSP signal is applied among a plurality of coils for a designated period of time or a designated number of times, the transmission IC 110 may be configured to determine that an external object (e.g., a key or a coin) rather than the wireless power reception device is placed on the electronic device 101, and stop the operation of transmitting the ping signal.

When the transmission IC 110 according to an embodiment determines that there is one coil to which the SSP signal is applied among the plurality of coils in operation 914, the transmission IC 110 may be configured to transmit wireless power through the coil to which the SSP signal is applied in operation 916.

When the transmission IC 110 according to an embodiment determines that there are two coils to which the SSP signal is applied among the plurality of coils in operation 914, the transmission IC 110 may be configured to identify a ping power level at the time of reception of the SSP signal through each of two coils (e.g., the first coil and the second coil) in operation 918. For example, the transmission IC 110 may be configured to identify a ping power level at which the SSP signal is identified among a plurality of ping power levels of the first step ping signal applied to the first coil, and a ping power level at which the SSP signal is identified among a plurality of ping power levels of the second step ping signal applied to the second coil. The transmission IC 110 according to an embodiment may compare the magnitudes of the first ping power level identified through the first coil and the second ping power level identified through the second coil. The transmission IC 110 according to an embodiment may be configured to perform operation 920 in case that the first ping power level identified through the first coil is lower than the second ping power level identified through the second coil, to perform operation 922 in case that the first ping power level identified through the first coil is higher than the second ping power level identified through the second coil, and to perform operation 924 in case that the first ping power level identified through the first coil is equal to the second ping power level identified through the second coil.

In operation 920, the transmission IC 110 according to an embodiment may be configured to transmit wireless power through the first coil in case that the first ping power level identified through the first coil is lower than the second ping power level identified through the second coil.

In operation 922, the transmission IC 110 according to an embodiment may be configured to transmit wireless power through the second coil in case that the first ping power level identified through the first coil is higher than the second ping power level identified through the second coil.

In operation 924, the transmission IC 110 according to an embodiment may be configured to identify the SSP values identified through each of the first and second coils in case that the first ping power level identified through the first coil is the same as the second ping power level identified through the second coil. For example, the transmission IC 110 may be configured to identify whether the first SSP value identified through the first coil is greater than or equal to the second SSP value identified through the second coil, and whether the first SSP value identified through the first coil is smaller than the second SSP value identified through the second coil. For example, when the first SSP value identified through the first coil is greater than or equal to the second SSP value identified through the second coil, the transmission IC 110 may proceed to operation 920 to transmit wireless power through the first coil. For example, in case that the first SSP value identified through the first coil is smaller than the second SSP value identified through the second coil, the transmission IC 110 may proceed to operation 922 to transmit wireless power through the second coil.

Although FIG. 9 shows a case where the SSP signals are received through two coils, when the SSP signals are received through three or more coils, a coil having a low ping power level and a larger SSP value may be selected by identifying the ping power level and SSP value, to perform a wireless power transfer operation.

Figure 10:
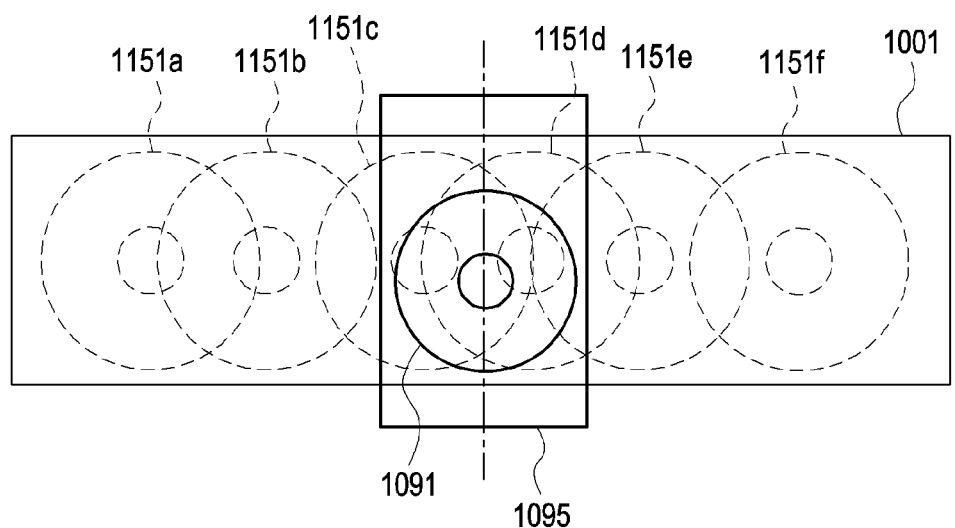
FIG. 10 schematically illustrates an example in which a wireless power reception device is disposed in an electronic device according to an embodiment.

FIG. 10 schematically illustrates an example in which a wireless power reception device is disposed in an electronic device according to an embodiment.

Referring to FIG. 10, a processor (e.g., a processor 1220 of FIG. 12) or a transmission IC (e.g., the transmission IC 110 of FIG. 1) of an electronic device 1001 (e.g., the electronic device 101 of FIG. 1) may be configured to control to sequentially apply a step ping signal to each of a plurality of coils 1051a, 1015b, 1015c, 1051d, 1051e, and 1051f. In an embodiment, for example, the transmission IC 110 may operate in a way such that a ping signal is applied in a sequence of a first coil 1051a, a fourth coil 1051d, a second coil 1015b, a fifth coil 1051e, a third coil 1015c, and a sixth coil 1051f. According to an alternative embodiment, the processor may be configured to control to sequentially apply a step ping signal to each of a plurality of coils 1051a, 1015b, 1015c, 1051d, 1051e, and 1051f through a plurality of transmission ICs including a first transmission IC (not shown) and a second transmission IC (not shown) instead of the transmission IC 110. For example, the first transmission IC may be configured to control the first coil 1051a, the second coil 1015b, and the third coil 1015c, and the second transmission IC may be configured to control the fourth coil 1051d, the fifth coil 1051e, and the sixth coil 1051f. The first transmission IC and the second transmission IC may operate in a way such that coils to which the step ping signal is applied are not adjacent to each other. According to an embodiment, the order in which the step ping signal is applied to each of the plurality of coils 1051a, 1015b, 1015c, 1051d, 1051e, and 1051f has no limitation as long as the coils do not interfere with each other. For example, the transmission IC 110 may be configured to control the step ping signal to be applied in a sequence of the third coil 1015c, the fourth coil 1051d, the second coil 1015b, the fifth coil 1051e, the first coil 1051a, and the sixth coil 1051f.

The wireless power reception device 1095 may be mounted (or placed) on the electronic device 1001, and as shown in FIG. 10, the wireless power reception device 1095 may be arranged between some coils (e.g., the third coil 1015c and the fourth coil 1051d) among the plurality of coils. The arrangement position shown in FIG. 10 is merely an example, and it is obvious that a user may arrange the wireless power reception device 1095 between different coils.

As shown in FIG. 10, in case that the wireless power reception device 1095 is disposed between a plurality of coils and the electronic device 1001 applies a step ping signal to each of the plurality of coils, the wireless power receiver 1095 may allow at least one SSP signal to be applied to the electronic device 1001 through at least one coil among a plurality of coils.

The transmission IC 110 of the electronic device 1001 may be configured to identify a ping power level at which at least one SSP signal has been identified, and select a coil associated with an SSP signal received at the lowest ping power level. Alternatively, the transmission IC 110 of the electronic device 1001 may be configured to select a coil for wireless power transfer by identifying an SSP value and at least one ping power level associated with at least one SSP signal. For example, the transmission IC 110 of the electronic device 1001 may be configured to identify a ping power level at which at least one SSP signal has been identified, identify a coil associated with an SSP signal identified at the lowest ping power level, and when there are two or more coils associated with the SSP signal identified at the lowest ping power level, identify each SSP value to select a coil corresponding to the lowest ping power level and having a large SSP value.

Figure 11A:
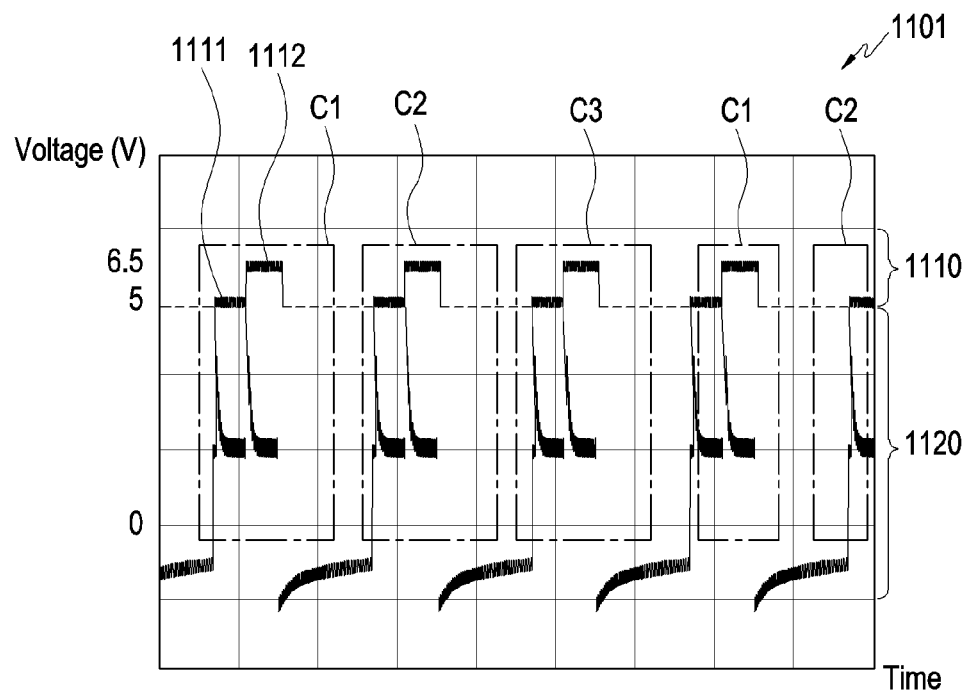
FIG. 11A illustrates a signal waveform in case that an SSP signal is not identified in a state in which a step ping signal is applied to each of a plurality of coils according to an embodiment.
Figure 11B:
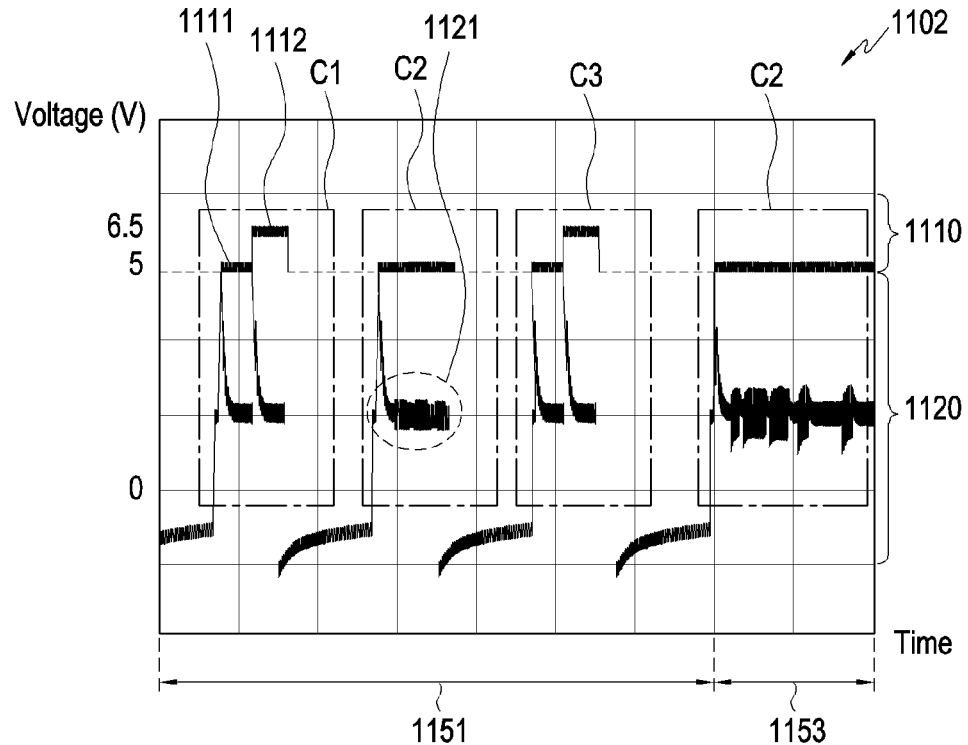
FIG. 11B illustrates a signal waveform in case that an SSP signal according to a first ping power level is identified in a state in which a step ping signal is applied to each of a plurality of coils according to an embodiment.
Figure 11C:
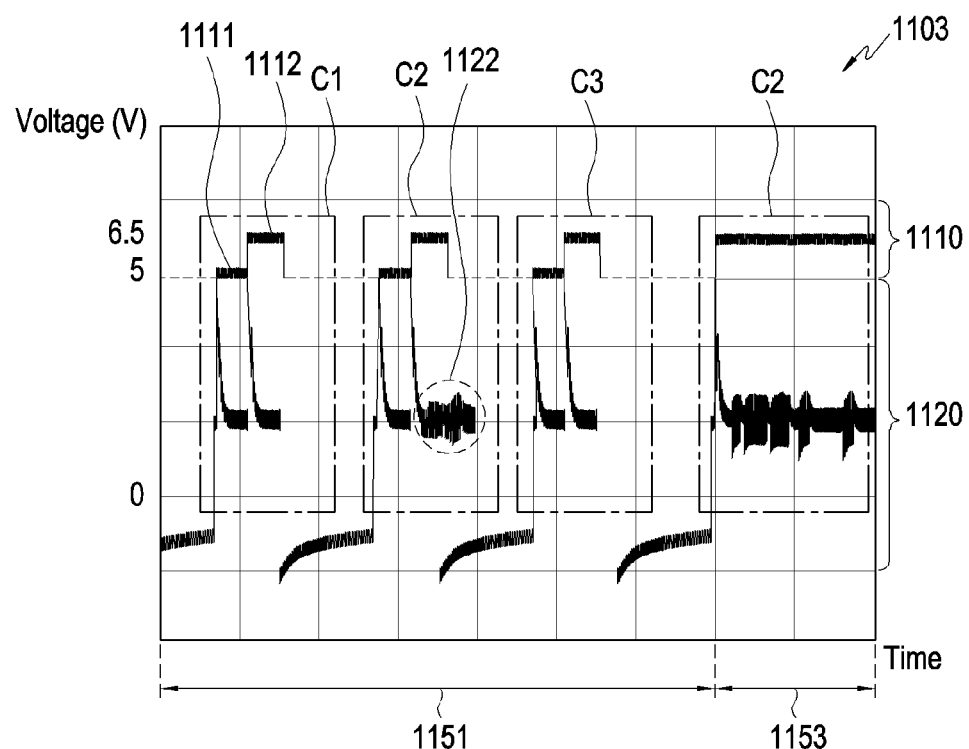
FIG. 11C illustrates a signal waveform in case that an SSP signal according to a second ping power level is identified in a state in which a step ping signal is applied to each of a plurality of coils according to an embodiment.
Figure 11D:
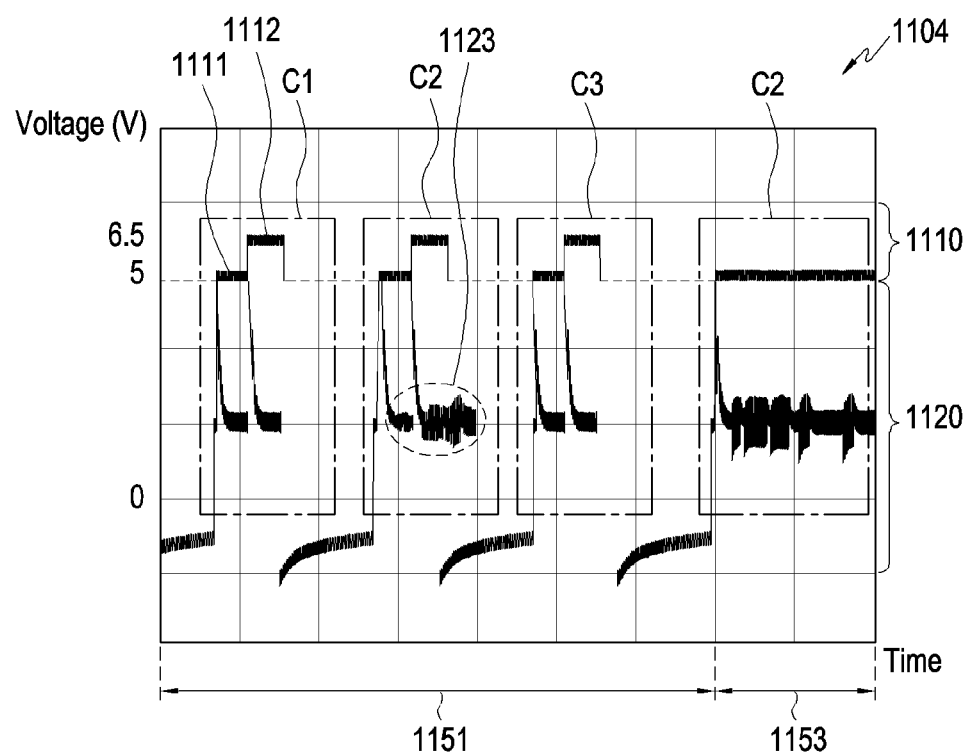
FIG. 11D illustrates a signal waveform in case that an SSP signal according to a first ping power level and a second ping power level is identified through one coil in a state in which a step ping signal is sequentially applied to each of a plurality of coils according to an embodiment.
Figure 11E:
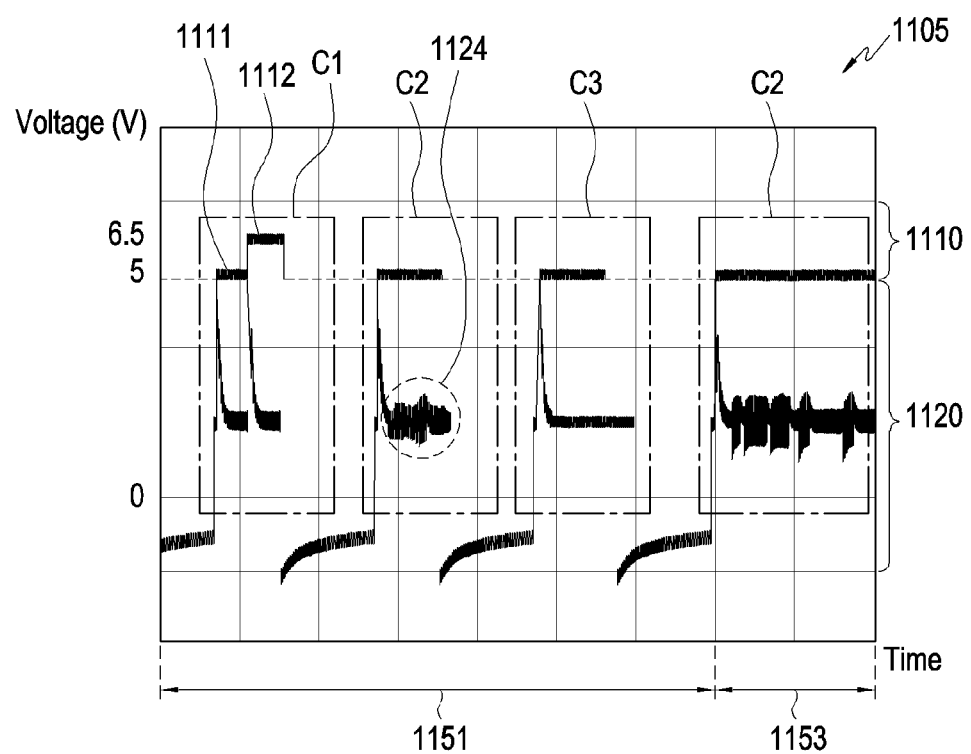
FIG. 11E illustrates a signal waveform in the case of providing a ping signal having a first ping power level instead of a step ping signal in case that an SSP signal according to a first ping power level is identified through one coil while sequentially applying a step ping signal to each of a plurality of coils according to an embodiment.

FIG. 11A illustrates a signal waveform in case that an SSP signal is not identified in a state in which a step ping signal is applied to each of a plurality of coils according to an embodiment. FIG. 11B illustrates a signal waveform in case that an SSP signal according to a first ping power level is identified in a state in which a step ping signal is applied to each of a plurality of coils according to an embodiment. FIG. 11C illustrates a signal waveform in case that an SSP signal according to a second ping power level is identified in a state in which a step ping signal is applied to each of a plurality of coils according to an embodiment. FIG. 11D is a signal waveform in case that an SSP signal according to a first ping power level and a second ping power level is identified through one coil in a state in which a step ping signal is sequentially applied to each of a plurality of coils according to an embodiment. FIG. 11E illustrates a signal waveform at the time of providing a ping signal having a first ping power level instead of a step ping signal in case that an SSP signal according to a first ping power level is detected through one coil while sequentially applying a step ping signal to each of a plurality of coils according to an embodiment.

Referring to FIG. 11A, a step ping signal waveform 1110 and an SSP signal detection signal waveform 1120 in response to the step ping signal according to an embodiment may be shown as a first graph 1101 when the SSP signal is not identified while the step ping signal is applied to the plurality of coils (e.g., C1, C2, and C3). In the first graph 1101, the horizontal axis may indicate time (ms) and the vertical axis may indicate voltage (V).

According to an embodiment, the step ping signal waveform 1110 may be a waveform indicating a step ping signal applied to a coil, and a step ping signal in which ping power is increased in stages from a first ping power level 1111 based on a first voltage (e.g., about 5 V) to a second ping power level 1112 based on a second voltage (e.g., about 6.5 V) in a ping power duration may be applied to the coil. According to an embodiment, the step ping signal waveform 1110 shown in FIG. 11A may show a case in which a step ping signal is applied and transmitted to one coil or a case in which a step ping signal is sequentially applied and transmitted to a plurality of coils. According to an embodiment, the SSP signal detection signal waveform 1120 may be a waveform representing a signal which is input from a coil and then input to a demodulator. The electronic device 1001 may be configured to identify whether the SSP signal is received through the coil by identifying a signal which is input from the coil and then input to the demodulator during the ping power duration of the step ping signal. Referring to FIG. 11A, when the SSP signal is not identified while the step ping signal is applied to the plurality of coils (e.g., C1, C2, and C3) according to an embodiment, a current component corresponding to the SSP signal may not be detected from the waveform of signal input to the demodulator.

Referring to FIG. 11B, a step ping signal waveform 1110 and an SSP signal detection signal waveform 1120 in response to a step ping signal according to an embodiment may be shown as a second graph 1102 in case that a step ping signal is applied to each of a plurality of coils (e.g., C1, C2, and C3) and an SSP signal is identified at the first ping power level 1111 of one coil (e.g., C2 coil). In the second graph 1102, the horizontal axis may indicate time (ms) and the vertical axis may indicate voltage (V). For example, an SSP signal 1121 may be identified through a partial change in voltage in the SSP signal detection signal waveform 1120 in response to the step ping signal in one coil (e.g., C2 coil) during a ping duration 1151. In addition, when the SSP signal is identified (indicated by reference numeral 1121), the transmission IC 110 may be configured to identify a first ping power level (e.g., about 5 V) at the time point of identification of the SSP signal. According to an embodiment, authentication may be performed based on the identified first ping power level (e.g., about 5 V) in an authentication duration 1153.

Referring to FIG. 11C, a case in which a step ping signal waveform 1110 is applied to each of a plurality of coils (e.g., C1, C2, and C3) and an SSP signal based on a second ping power level 1112 is identified in one coil (e.g., C2) according to an embodiment may be shown as a third graph 1103. For example, in case that the SSP signal is identified at the second ping power level 1112 in a state in which a step ping signal is applied to one coil (e.g., C2) during a ping duration 1151, the transmission IC 110 may be configured to identify a second ping power level (e.g., about 6.5 V) at the time point of identification of the SSP signal. According to an embodiment, authentication may be performed through the C2 coil based on the identified second ping power level (e.g., about 6.5 V) in an authentication duration 1153.

Referring to FIG. 11D, a step ping signal waveform 1110 and an SSP signal detection signal waveform 1120 in response to a step ping signal according to an embodiment may be shown as a fourth graph 1104 in case that a step ping signal is sequentially applied to a plurality of coils (e.g., C1, C2, and C3) and the SSP signal is identified at a first ping power level 1111 and a second ping power level 1112 of one coil (e.g., C2) among the plurality of coils. For example, the electronic device 1101 may be configured to sequentially apply a step ping signal to a plurality of coils (e.g., C1, C2, and C3), identify whether reception of the SSP signal through each coil occurs, and when the SSP is received, identify a ping power level at the time point of the SSP reception. For example, an SSP signal 1123 may be identified through a partial change in voltage in the SSP signal detection signal waveform 1120 in response to the step ping signal, and in case that the SSP signal is identified 1123, the transmission IC 110 may be configured to identify the coil C2 through which the SSP signal is identified and a first ping power level (e.g., about 5 V) and a second ping power level (e.g., about 6.5 V) at which the SSP signal is identified. The transmission IC 110 may be configured to identify a lower first ping power level (e.g., about 5 V) among the first ping power level (e.g., about 5 V) and the second ping power level (e.g., about 6.5 V) at which the SSP signal is identified, and perform authentication based on the first ping power level (e.g., about 5 V) in an authentication duration 1153.

Referring to FIG. 11E, a step ping signal waveform 1110 and an SSP signal detection signal waveform 1120 in response to a step ping signal according to an embodiment may be shown as a fifth graph 1105 in case that an SSP signal is identified at the first ping power level 1111 of one coil (e.g., C2) among a plurality of coils (e.g., C1, C2, and C3) while the step ping signal is sequentially applied to the plurality of coils. For example, when an SSP signal 1124 is identified at the first ping power level 1111 of one coil (e.g., C2) while sequentially applying the step ping signal to the plurality of coils (e.g., C1, C2, and C3), the electronic device 1001 may be configured to apply a ping signal of the first ping power level 1111 to coils (e.g., C3) after C2 and to identify whether reception of the SSP signal through each coil occurs. In case that there is no SSP signal received through coils after C2, the transmission IC 110 may be configured to identify the coil C2 through which the SSP signal is identified and the first ping power level (e.g., about 5 V) at which the SSP signal is identified, and perform authentication based on the first ping power level (e.g., about 5 V) in an authentication duration 1153. On the other hand, in case that the SSP signal is received through coils after C2 (not shown), the transmission IC may be configured to identify a coil having the largest SSP value and select the coil having the largest SSP value, so as to perform authentication based on the first ping power level (e.g., about 5 V) in the authentication duration 1153.

According to various embodiments, the electronic device may be configured to provide a ping signal having a plurality of ping power durations in which the ping power is increased in stages, so as to provide a ping signal of suitable power to the wireless power reception device.

According to various embodiments, the electronic device may be configured to provide a ping signal, having a plurality of ping power durations in which the ping power of the ping signal is increased in stages, through a plurality of coils, and when a plurality of SSP signals are received, identify a coil having a low ping power to easily perform identification of location of a wireless power device and selection of a coil for wireless power transfer.

According to an embodiment, the electronic device 101 may be configured to select a first coil from among a plurality of coils, transmit a first step ping signal through the selected first coil, identify an SSP value and/or whether an SSP signal response occurs or not based on the first step ping signal, and then perform the procedure of step ping signal transmission and identification of SSP value and/or whether the SSP signal response occurs or not with respect to each of subsequent coils, to select a coil having a low ping power level and a larger SSP value during SSP response as the coil for wireless power transfer.

According to an embodiment, instead of transmitting a step ping signal having a plurality of ping power levels (e.g., a first ping power level and a second ping power level) to each of the plurality of coils, a plurality of ping signals having different ping power levels (e.g., a first ping signal having a first ping power level or a second ping signal having a second ping power level) may be transmitted, an SSP value and/or whether an SSP signal response occurs or not with respect to each of a plurality of ping signals may be identified, and then a coil having a low ping power level and a large SSP value during SSP response may be selected as the coil for wireless power transfer. For example, in case that a plurality of ping signals having different ping power levels are used and an SSP signal having a value equal to or greater than a predetermined value is received after transmission of the first ping signal having a first ping power level, wireless power transfer is started (e.g., a wireless power mode is configured) based on the first ping power level and the second ping signal of the second ping power level may not be transmitted.

Hereinafter, an electronic device 1201 (e.g., the wireless power reception device 195 of FIG. 1) capable of wirelessly receiving power by the electronic device 101 according to various embodiments will be described.

Figure 12:
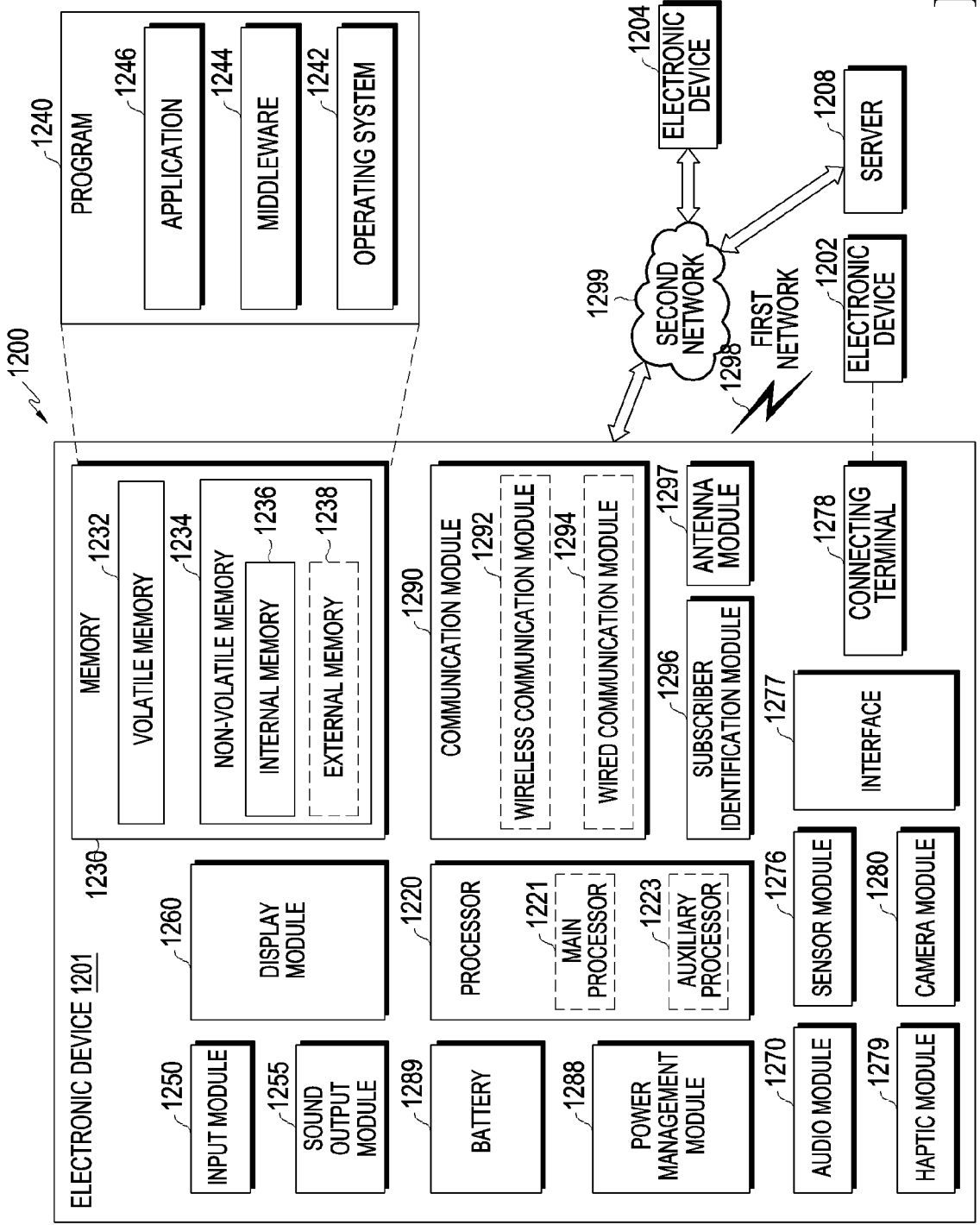
FIG. 12 is a block diagram of an electronic device in a network environment according to various embodiments.

FIG. 12 is a block diagram illustrating an electronic device 1201 in a network environment 1200 according to various embodiments.

Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In some embodiments, at least one of the components (e.g., the connecting terminal 1278) may be omitted from the electronic device 1201, or one or more other components may be added in the electronic device 1201. In some embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include the transmission IC 110 of FIG. 1. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control, for example, at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active (e.g., executing an application) state. According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure. The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user)

of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or an external electronic device (e.g., an electronic device 1202 (e.g., a speaker or a headphone)) directly or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, an HDMI connector, a USB connector, an SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device 1204 via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify or authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the external electronic devices 1202 or 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In another embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention should not be construed as being limited to the embodiments set forth herein. Rather, these embodiments are provided so that this disclosure will be thorough and complete and will fully convey the concept of the invention to those skilled in the art.

According to various embodiments, there may be provided a non-volatile computer-readable storage medium storing instructions, where the instructions are configured to, when executed by at least one processor, cause the at least one processor to perform at least one operation, the at least one operation including applying, to a coil, a ping signal in which a ping power duration having a plurality of ping power levels increasing in stages is periodically repeated, identifying an SSP signal in response to the ping signal, and transmitting wireless power through the coil based on a ping power level at which the SSP signal is identified among a plurality of ping power levels.

According to various embodiments, there may be provided a non-volatile computer-readable storage medium storing instructions, wherein the instructions are configured to, when executed by at least one processor, cause the at least one processor to perform at least one operation, the at least one operation including applying, to each of the plurality of coils, a ping signal in which a ping power duration having a plurality of ping power levels increasing in stages is periodically repeated, identifying at least one coil, through which a signal strength packet (SSP) signal in response to the ping signal is detected, among the plurality of coils, selecting a coil for wireless power transfer based on a ping power identified during detection of the SSP signal in each of the at least one coil, and wirelessly transmitting power through the selected coil.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic device comprising:
a coil;
a power conversion circuit configured to receive a direct current (DC) power, convert the DC power into an alternating current (AC) power, and output the AC power to the coil; and
a processor,
wherein the processor is configured to:
apply, to the coil, a ping signal in which a ping power duration having a plurality of ping power levels increasing in stages is repeated periodically,
identify a signal strength packet (SSP) signal in response to the ping signal, and
perform a wireless power transfer operation through the coil based on a ping power level at which the SSP signal is identified from among the plurality of ping power levels.

2. The electronic device of claim 1, wherein the plurality of ping power levels comprise a first ping power level and a second power level higher than the first power level.

3. The electronic device of claim 2, wherein the power conversion circuit is configured to increase a power level of the ping signal from the first power level to the second power level during the ping power duration based on a voltage.

4. The electronic device of claim 2, wherein the power conversion circuit is configured to increase a power level of the ping signal from the first power level to the second power level during the ping power duration based on a frequency.

5. An electronic device comprising:
a plurality of coils;
a plurality of power conversion circuits each configured to receive a direct current (DC) power, convert the DC power into an alternatively current (AC) power, and output the AC power to each of the plurality of coils; and
a processor,
wherein the processor is configured to
apply, to each of the plurality of coils, a ping signal in which a ping power duration having a plurality of ping power levels increasing in stages is repeated periodically,
identify at least one coil, through which a signal strength packet (SSP) signal in response to the ping signal is detected, among the plurality of coils; and
select a coil for wireless power transfer based on a ping power identified during detection of the SSP signal among the at least one coil.

6. The electronic device of claim 5, wherein the processor is configured to, in case that the SSP signal is detected through two or more coils among the plurality of coils, select a coil through which the SSP signal is detected at the lowest ping power level among the two or more coils.

7. The electronic device of claim 6, wherein the processor is configured to, in case that the SSP signal is detected at the lowest ping power level through two or more coils among the plurality of coils, identify SSP values detected in the two or more coils through which the SSP signal is detected at the lowest ping power level, and select a coil, based on the SSP values, among the two or more coils.

8. The electronic device of claim 7, wherein the coil selected based on the SSP values is a coil having the largest SSP value among the SSP values.

9. The electronic device of claim 5, wherein the processor is configured to sequentially apply a ping signal to each of the plurality of coils.

10. The electronic device of claim 5, wherein the processor is configured to apply a ping signal to coils in a sequence of coils non-adjacent to each other, based on an arrangement of the plurality of coils.

11. The electronic device of claim 5, wherein the plurality of ping power levels comprise a first ping power level and a second power level higher than the first power level.

12. The electronic device of claim 11, wherein each of the plurality of power conversion circuits is configured to increase a power level of the ping signal from the first power level to the second power level during the ping power duration based on a voltage and/or a frequency.

13. A method for transmitting wireless power based on a ping signal having a plurality of ping power levels in an electronic device, the method comprising:
 applying, to each of a plurality of coils of the electronic device, a ping signal in which a ping power duration having a plurality of ping power levels increasing in stages is repeated periodically;
 identifying at least one coil, through which a signal strength packet (SSP) signal in response to the ping signal is detected, among the plurality of coils;
 selecting a coil for wireless power transfer based on a ping power identified during detection of the SSP signal among the at least one coil; and
 wirelessly transmitting power through the selected coil.

14. The method of claim 13, further comprising, in case that the SSP signal is detected through two or more coils among the plurality of coils, selecting a coil through which the SSP signal is detected at the lowest ping power level, among the two or more coils.

15. The method of claim 14, further comprising, in case that the SSP signal is detected at the lowest ping power level through two or more coils, identifying SSP values detected in the two or more coils through which the SSP signal is detected at the lowest ping power level, and selecting a coil, based on the SSP values, among the two or more coils through which the SSP signal is detected at the lowest ping power level.

16. The method of claim 15, wherein the selecting the coil comprises, selecting the coil selected based on the SSP values is a coil having the largest SSP value among the SSP values.

17. The method of claim 13, wherein the applying the ping signal comprises, applying the ping signal to coils in a sequence of coils non-adjacent to each other, based on an arrangement of the plurality of coils.

18. The method of claim 17, wherein the applying the ping signal comprises, applying the ping signal to coils in a sequence of coils non-adjacent to each other, based on an arrangement of the plurality of coils.

19. The method of claim 13, wherein the plurality of ping power levels comprise a first ping power level and a second power level higher than the first power level.

20. The method of claim 19, wherein the plurality of ping power levels comprise a first ping power level and a second power level higher than the first power level.

\* \* \* \* \*